(12) United States Patent
Watanabe

(10) Patent No.: US 8,041,169 B2
(45) Date of Patent: Oct. 18, 2011

(54) OPTICAL SIGNAL PROCESSING DEVICE

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 280 days.

(21) Appl. No.: 12/425,142

(22) Filed: Apr. 16, 2009

(65) Prior Publication Data

US 2010/0021105 A1  Jan. 28, 2010

(30) Foreign Application Priority Data

Jul. 22, 2008  (JP) .................................. 2008-188657

(51) Int. Cl.
| | |
|---|---|
| G02B 6/00 | (2006.01) |
| G02F 1/35 | (2006.01) |
| G02F 2/02 | (2006.01) |
| H01S 3/00 | (2006.01) |
| H04B 10/12 | (2006.01) |

(52) U.S. Cl. ........................ 385/122; 359/328; 359/341.3
(58) Field of Classification Search .................. 385/122; 359/328, 329, 341.1–341.3
See application file for complete search history.

(56) References Cited

U.S. PATENT DOCUMENTS

| | | | | |
|---|---|---|---|---|
| 6,529,314 | B1 * | 3/2003 | Shukunami et al. | 359/332 |
| 6,597,494 | B2 * | 7/2003 | Segi et al. | 359/341.1 |
| 6,744,553 | B1 | 6/2004 | Islam et al. | |
| 6,963,675 | B2 | 11/2005 | Watanabe | |
| 7,043,099 | B1 | 5/2006 | Watanabe | |
| 7,164,526 | B2 * | 1/2007 | McKinstrie et al. | 359/330 |
| 7,388,710 | B2 * | 6/2008 | Ono et al. | 359/330 |
| 7,436,580 | B2 * | 10/2008 | McKinstrie | 359/330 |
| 2004/0042060 | A1 * | 3/2004 | McKinstrie et al. | 359/330 |
| 2005/0099674 | A1 | 5/2005 | Watanabe | |
| 2006/0045445 | A1 * | 3/2006 | Watanabe | 385/122 |
| 2006/0051100 | A1 | 3/2006 | Watanabe | |
| 2006/0285197 | A1 * | 12/2006 | McKinstrie | 359/333 |
| 2007/0216994 | A1 * | 9/2007 | McKinstrie | 359/341.31 |
| 2007/0230518 | A1 | 10/2007 | Watanabe | |

FOREIGN PATENT DOCUMENTS

| | | |
|---|---|---|
| EP | 0 643 320 | 3/1995 |
| EP | 1 245 997 | 10/2002 |
| EP | 1 245 997 A | 10/2002 |
| EP | 1 841 100 | 9/2006 |
| JP | 04-22928 | 1/1992 |
| JP | 2000-75330 | 3/2000 |
| JP | 2006-184851 | 7/2006 |

(Continued)

OTHER PUBLICATIONS

European Office Action issued Jan. 24, 2011 in corresponding European Patent Application 09 005 490.9.

(Continued)

*Primary Examiner* — Rhonda Peace
(74) *Attorney, Agent, or Firm* — Staas & Halsey LLP

(57) ABSTRACT

An optical signal processing device has nonlinear optical medium, first and second power controllers, and polarization controllers. To the nonlinear optical medium, signal light, and first and second pumping lights having wavelengths different from the signal light are input. The first and the second power controllers are provided at the input side of the nonlinear optical medium, and control the powers of the first and the second pumping lights so that a predetermined gain is obtained in the nonlinear optical medium. The polarization controllers are provided at the input side of the nonlinear optical medium, and adjust the first and the second pumping lights so that the polarization states of the first and the second pumping lights are mutually orthogonal.

19 Claims, 18 Drawing Sheets

FOREIGN PATENT DOCUMENTS

JP        2007-264319        10/2007

OTHER PUBLICATIONS

Yamashita S. et al., "Optical 2R Regeneration Using Cascaded Fiber Four-Wave Mixing with Suppressed Spectral Spread", IEEE Photonics Technology Letters IEEE, USA, vol. 18, No. 9, May 2006, pp. 1064-1066.

Agrawal G. P. et al., "Effects of Polarization-Mode Dispersion in Dual-Pump Fiber Optic Parametric Amplifiers", IEEE Photonics, Technology Letters, IEEE, Service Center, Piscataway, NJ, US, vol. 16, No. 2, Feb. 1, 2004, pp. 431-433.

Yamashita S et al., "Polarization Independent, All-Fiber Phase Conjugation Incorporating Inline Fiber DFB Lasers", IEEE Photonics Technology Letters IEEE, USA.

Kenneth K.Y. Wong et al., "Polarization-Independent Two-Pump Fiber Optical Parametric Amplifier" IEEE Photonics Technology Letters, IEEE Service Center, Piscataway, NJ, US, vol. 14, No. 7, Jul. 1, 2002.

Qiang Lin et al., "Vector Theory of Four-Wave Mixing: Polarization Effects in Fiber-Optic Parametric Amplifiers" Journal of the Optical Society of America B (Optical Physics) Opt. Soc. America, USA, vol. 21, No. 6, Jun. 2004, pp. 1216-1224.

European Search Report dated Apr. 19, 2010 and issued in corresponding European Patent Application 10152629.1.

European Office Action dated Apr. 15, 2010 and issued in corresponding European Patent Application 09 005 490.9.

Kenneth K. Y. Wong, et al., "Polarization-Independent One-Pump Fiber-Optical Parametric Amplifier", IEEE Photonics Technology Letters, vol. 14, No. 11, Nov. 2002.

Kenneth K. Y. Wong, et al., "Polarization-Independent Two-Pump Fiber Optical Parametric Amplifier", IEEE Photonics Technology Letters, vol. 14, No. 7, Jul. 2002.

European Search Report issued on Aug. 24, 2009 in corresponding European Patent Application No. 09005490.9.

Kenneth K. Y. Wong et al., "Polarization-Independent One-Pump Fiber-Optical Parametric Amplifier", Nov. 1, 2002, IEEE Photonics Technology Letters, IEEE Service Center, Piscataway, NJ, US, pp. 1041-1135.

Chow K.K. et al., "External-Pump-Free Polarization-Insensitive Wavelength Converter with Fast Wavelength Switching Using Orthogonal Pumps Four-Wave Mixing in a Semiconductor Optical Amplifier", IEEE Journal of Selected Topics in Quantum Electronics, IEEE Service Center, Piscataway, NJ, US, vol. 10, No. 5, Sep. 1, 2004, pp. 1197-1202.

* cited by examiner

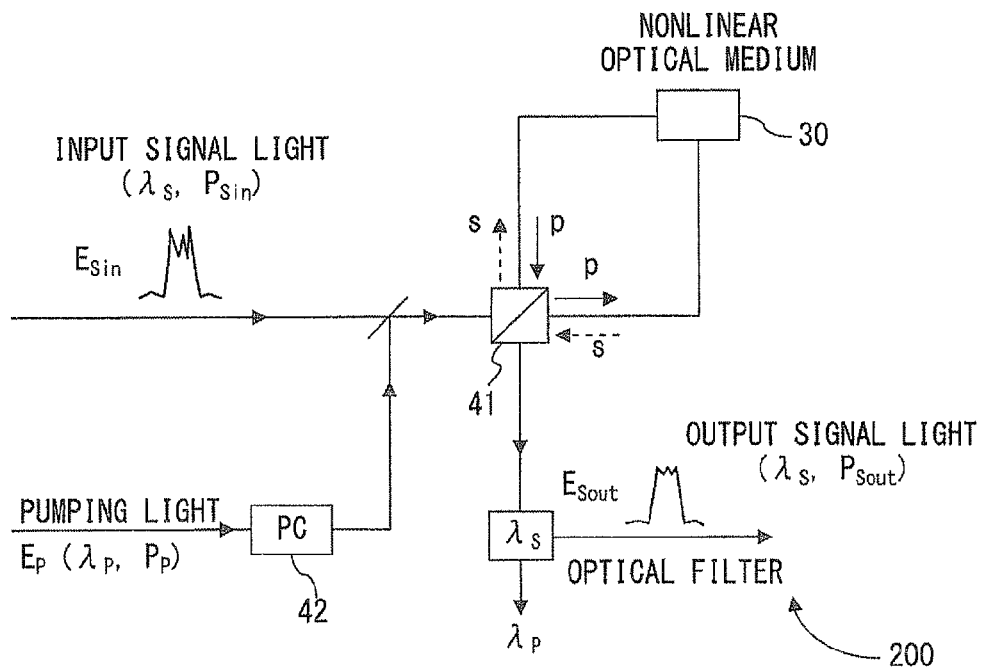
F I G. 1 0 A
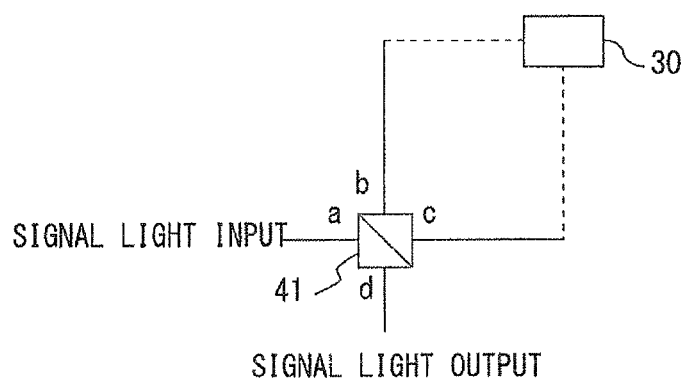
F I G. 1 0 B

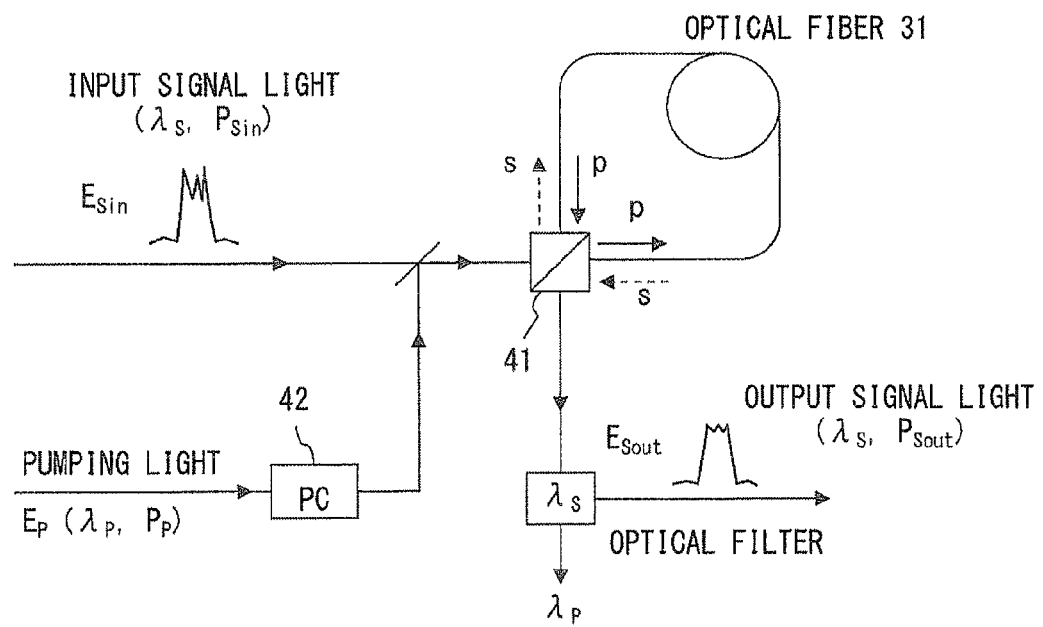
F I G. 1 1

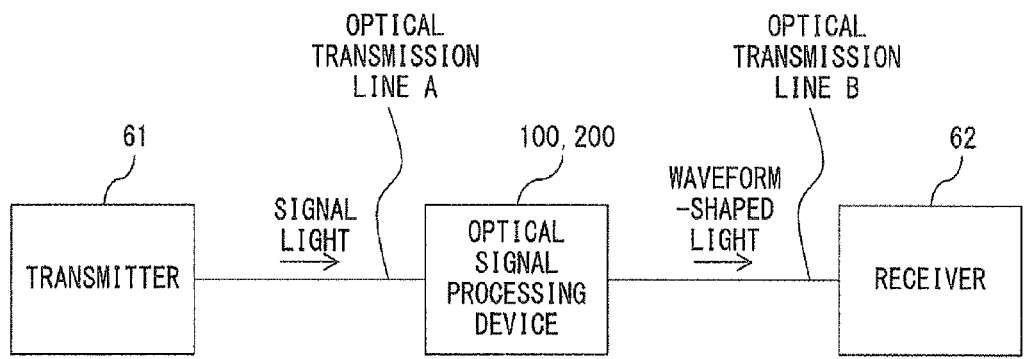
F I G. 17A
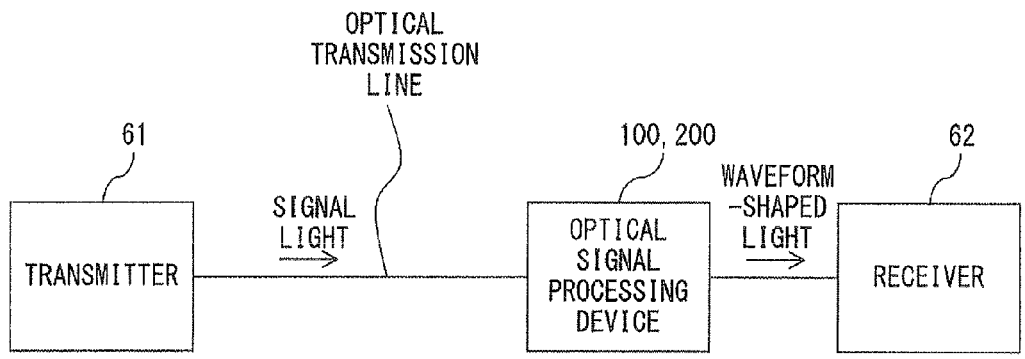
F I G. 17B

OPTICAL SIGNAL PROCESSING DEVICE

CROSS-REFERENCE TO RELATED APPLICATIONS

This application is based upon and claims the benefit of priority of the prior Japanese Patent Application No. 2008-188657, filed on Jul. 22, 2008, the entire contents of which are incorporated herein by reference.

FIELD

The present invention relates to an optical signal processing device. The present invention may be applied, for example, to an optical switch, a wavelength converter, a device for shaping the waveform of an optical signal degraded by optical fiber transmission, a device for improving the quality (especially, an optical S/N) of an optical signal degraded by noise caused by an optical fiber transmission, and the like.

BACKGROUND

In an optical communication system, the limits of a transmission speed (bit rate of data) or a total data transmission capacity (transmission speed per channel×number of channels), and a possible transmission distance depend on an optical S/N ratio (Optical Signal-to-Noise Ratio), and the waveform distortion or the phase distortion of an optical signal. The waveform distortion and the phase distortion of an optical signal significantly depend on the chromatic dispersion (including high-order dispersion) of a transmission line optical fiber, a nonlinear optical effect, etc. Moreover, the optical S/N ratio depends on an amplified spontaneous emission (ASE) noise caused by an optical amplifier for compensating for the loss of an optical fiber, or a noise characteristic, etc. within a transmitter or a receiver.

The following techniques for compensating for the waveform distortion of an optical signal, which is caused by chromatic dispersion, are known.
(1) A transmission line where a normal dispersion fiber and an anomalous dispersion fiber are alternately provided.
(2) A chromatic dispersion compensator such as a dispersion compensation fiber, etc.
(3) A configuration for executing electric signal processing after converting a received optical signal into an electric signal.

Up to now, an optical fiber transmission system for making a 10-Gbps long-distance data transmission while compensating for a transmission loss with an optical amplifier has been developed. Moreover, a higher-speed long-distance data transmission (such as 40 Gbps, 160 Gbps) and a method for providing an expandable system margin to a photonic network have been developed.

However, waveform distortion remains and the optical S/N ratio is seriously degraded by an ASE noise that is caused by an optical amplifier even if dispersion compensation of high precision and an optical amplifier of high quality are combined. Therefore, a practical transmission distance is limited. To realize a long-distance optical fiber transmission of a high-speed signal, the demand for an optical signal recovery device equipped with a technique for shaping a distorted optical waveform, a technique for correcting a phase distortion, and a technique for suppressing accumulated ASE noise, phase noise, etc. has been rising.

Additionally, in an optical network that functions as a communication backbone for future ultra-large capacity information, optical node processing that is implemented by combining techniques for elements such as an optical switch, a wavelength converter, etc., and can flexibly process the above described high-speed signal light is essential, and an optical signal processing device less degrading an optical S/N, and a device for improving the optical S/N are required.

An optical switch having a polarization controller, a nonlinear optical medium, and a polarizer is known as a related technique. The polarization controller controls the polarization direction of signal light. To the nonlinear optical medium, signal light the polarization direction of which is controlled by the polarization controller is input. The polarizer is provided at the output side of the nonlinear optical medium, and has a polarization axis orthogonal to the polarization direction of the signal light output from the nonlinear optical medium. The signal light is parametrically amplified by a control light pulse around the polarization direction of the control light pulse in the nonlinear optical medium. As a result, an optical signal overlapping with the control light pulse in time domain passes through the polarizer.

As a technique for shaping the waveform of an optical signal, an optical waveform shaping device having first and second power controllers and a nonlinear optical medium is known. The first power controller controls the power of signal light. The second power controller controls the power of pumping light having a wavelength different from the signal light. To the nonlinear optical medium, signal light the power of which is controlled by the first power controller, and pumping light the power of which is controlled by the second power controller are input. The first power controller controls the power of the signal light so that a gain generated by the pumping light becomes saturated in the nonlinear optical medium. As a result, an optical limiter function is realized, and an optical waveform is shaped.

A configuration having a polarization beam splitter and a polarization maintaining fiber is known as a wavelength converter. To a first port of the polarization beam splitter, signal light and pumping light are provided. The polarization maintaining fiber connects between second and third ports of the polarization beam splitter. Wavelength-converted light is generated by four-wave mixing within the polarization maintaining fiber. The wavelength-converted light is output from the first port of the polarization beam splitter.

The related techniques are recited, for example, in the following Patent Documents 1 to 3.
Patent Document 1: Japanese Laid-open Patent Publication No. 2006-184851
Patent Document 2: Japanese Laid-open Patent Publication No. 2007-264319
Patent Document 3: Japanese Laid-open Patent Publication No. 2000-75330

The characteristics of optical signal processing (waveform shaping, noise suppression, etc.) depend on the polarization state of signal light. With the conventional technology, however, the configuration of an optical circuit that does not depend on the polarization state of signal light is complicated, and its loss is large. Therefore, the efficiency of optical signal processing is low. Especially, in an optical signal processing device that collectively processes the waveforms of a plurality of optical signals transmitted with wavelength-division multiplexing (WDM), such a loss exerts considerable influences.

SUMMARY

An optical signal processing device according to one aspect of the invention includes nonlinear optical medium to which signal light, and first and second pumping lights having wavelengths different from the signal light are input; first and second power controllers, provided at the input side of the nonlinear optical medium, to control the powers of the first and the second pumping lights so that a predetermined gain is obtained in the nonlinear optical medium; and a polarization controller, provided at the input side of the nonlinear optical medium, to adjust the first and the second pumping lights so that polarization states of the first and the second pumping lights are mutually orthogonal.

In the optical signal processing device configured as described above, the nonlinear optical medium may be realized by first and second optical fibers that are cascade-connected. In this case, the polarization controller generates first and second linear polarized lights that are mutually orthogonal. The first linear polarized light is input to the first optical fiber, and the second linear polarized light is input to the second optical fiber.

An optical signal processing device according to another aspect of the invention includes an optical splitter/coupler to split light input from a first port into mutually orthogonal linear polarized lights and to guide the split lights to second and third ports, and to polarization-couple lights input from the second and the third ports; a nonlinear optical medium provided between the second and the third ports of the optical splitter/coupler; a polarization controller to control the polarization state of pumping light to be input to the nonlinear optical medium; and an optical device to guide signal light, and pumping light, the polarization state of which is controlled by the polarization controller, to the first port of the optical splitter/coupler.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 10A and 10B illustrate a configuration of an optical signal processing device according to another aspect;

FIG. 11 illustrates a configuration of an optical signal processing device according to a fourth embodiment;

FIGS. 17A and 17B illustrate a configuration where an optical signal processing device is used in a communication system.

DESCRIPTION OF EMBODIMENTS

<Basic Configuration>

Figure 1:
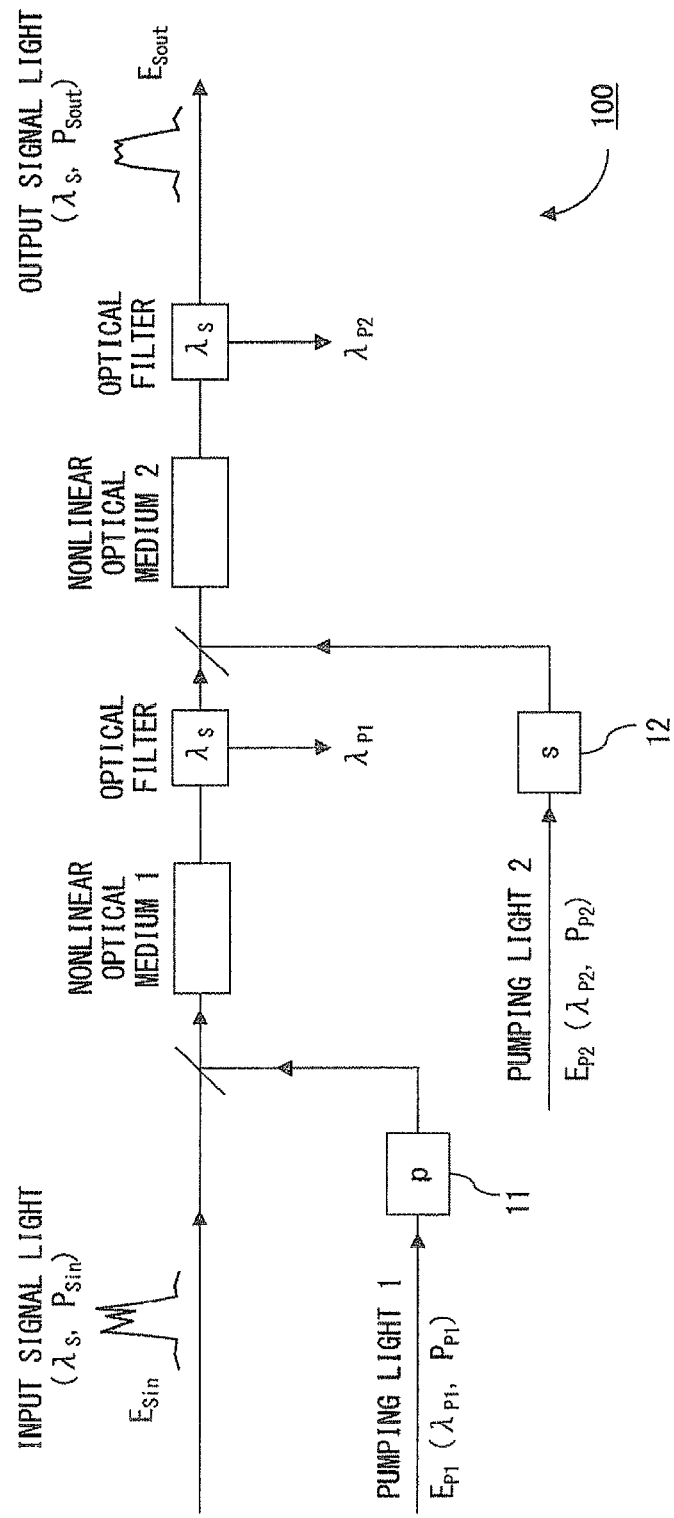
FIG. 1 illustrates a configuration of an optical signal processing device according to one aspect.

FIG. 1 illustrates a configuration of an optical signal processing devices according to one aspect. The optical signal processing device 100 illustrated in FIG. 1 includes nonlinear optical media 1 and 2. The nonlinear optical media 1 and 2 are cascade-connected.

To the nonlinear optical medium 1, signal light ($E_S$) of a wavelength $\lambda_s$ and power $P_{Sin}$, and pumping light 1 ($E_{P1}$) of a wavelength $\lambda_{P1}$ and power $P_{P1}$ are input. The wavelength $\lambda_{P1}$ is different from $\lambda_s$. The pumping light 1 is input to the nonlinear optical medium 1 after being controlled to be a particular polarization state with a polarization controller 11. Here, it is assumed that the pumping light 1 is controlled to be linear polarized light (p-polarization). Note that the term linear polarized light may be referred to plane polarized light, elliptically-polarized light, or circularly-polarized light. The signal light is nonlinearly amplified with the pumping light 1 in the nonlinear optical medium 1. At this time, the wavelength of the signal light output from the nonlinear optical medium 1 remains unchanged as the signal light input to the nonlinear optical medium 1, and continues to be $\lambda_s$. At the output side of the nonlinear optical medium 1 (namely, between the nonlinear optical media 1 and 2), an optical bandpass filter for extracting the wavelength component of the signal light is provided. Accordingly, the pumping light 1 is not input to the nonlinear optical medium 2. Examples of the optical filter for extracting the signal light include a bandpass filter and a band reject filter for cutting off a wavelength component (pumping light 1, etc.) other than the signal light, a WDM optical coupler, etc.

The signal light that is nonlinearly amplified with the pumping light 1 in the nonlinear optical medium 1 is input to the nonlinear optical medium 2 along with the pumping light 2. The pumping light 2 ($E_{P2}$) has a wavelength $\lambda_{P2}$ and power $P_{P2}$. The wavelength $\lambda_{P2}$ is different from $\lambda_s$. The pumping light 2 is input to the nonlinear optical medium 2 after being controlled to be a polarization state orthogonal to the pumping light 1 by using a polarization controller 12. In this example, the pumping light 2 is controlled to be linear polarized light (s-polarization). Moreover, the pumping light 1 is cut off by the optical filter provided between the nonlinear optical media 1 and 2. Accordingly, the signal light is nonlinearly amplified by the pumping light 2 without being affected by the pumping light 1 in the nonlinear optical medium 2. Also the wavelength of the signal light output from the nonlinear optical medium 2 remains unchanged as the signal light input to the nonlinear optical medium 1, and continues to be $\lambda_s$. At the output side of the nonlinear optical medium 2, an optical bandpass filter for extracting the wavelength component of the signal light is provided. Examples of the optical filter for extracting the signal light include a band reject filter for cutting off a wavelength component (pumping light 2, etc.) other than the signal light, a WDM optical coupler, etc.

The wavelength $\lambda_{P1}$ of the pumping light 1 and the wavelength $\lambda_{P2}$ of the pumping light 2 may be mutually identical or different. Moreover, the pumping lights 1 and 2 may be generated by using mutually different light sources, or by splitting pumping light output from one light source.

If the nonlinear optical media 1 and 2 are third-order or second-order nonlinear optical media, an optical parametric effect such as four-wave mixing (FWM), three-wave mixing (TWM), or the like is caused by the pumping light, and the signal light is parametrically amplified. The gain of the optical parametric amplification is constant regardless of $P_S$ if the power $P_P$ (namely, $P_{P1}$ or $P_{P2}$) of the pumping light is sufficiently higher than the power $P_S$ of the signal light. However, if $P_S$ increases and $P_P$ is not recognized to be sufficiently higher than $P_S$, the power of the pumping light consumed to produce the optical parametric effect increases. As a result, the phenomenon called "depletion" that the power $P_P$ of the pumping light attenuates in the nonlinear optical media 1 and 2 occurs.

Figure 2A:
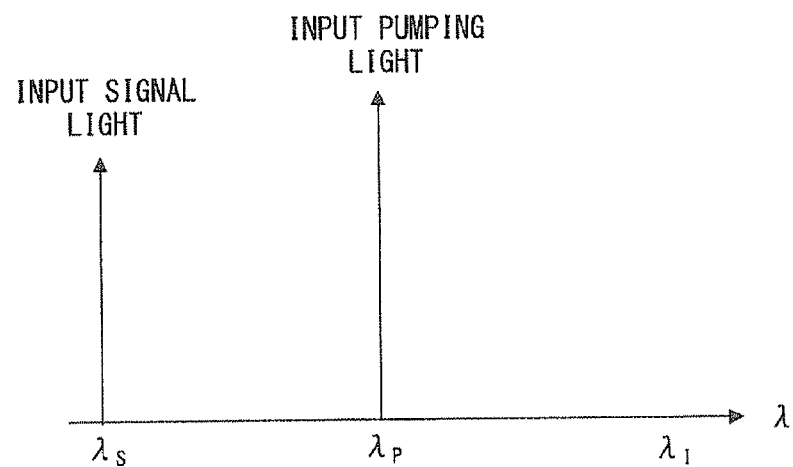
FIGS. 2A and 2B explain optical depletion.
Figure 2B:
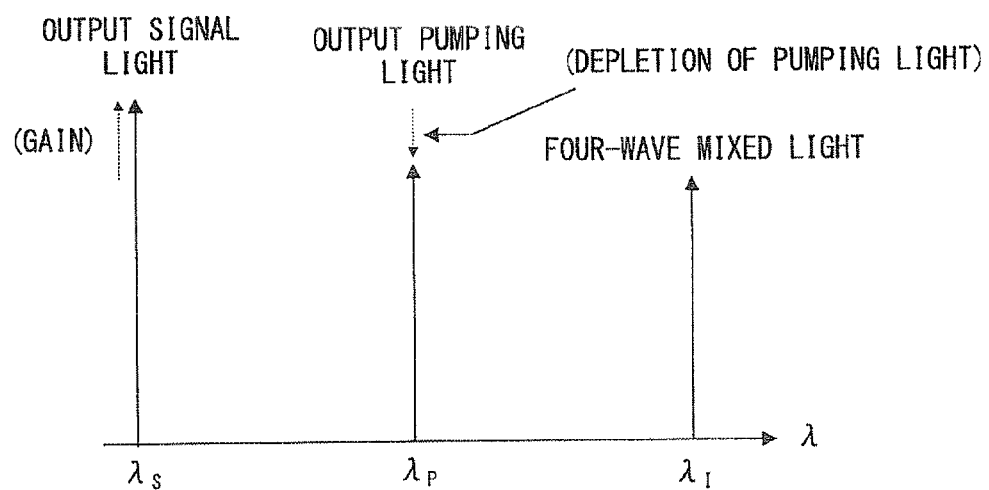

FIGS. 2A and 2B explain optical depletion. Here, assume that the signal light of wavelength $\lambda_S$ and the pumping light of wavelength $\lambda_P$ are input to optical fibers as the nonlinear optical medium. Note that the wavelength $\lambda_P$ of the pumping light may be longer or shorter than the wavelength $\lambda_S$ of the signal light.

In the interaction between the signal light and the pumping light, idler light (wavelength $\lambda_I$) corresponding to the signal light is generated, for example, by four-wave mixing as illustrated in FIG. 2B. In the four-wave mixing, the powers of the signal light and the idler light are amplified. At this time, part of the energy of the pumping light is almost equally provided to the signal light and the idler light. The frequency $\omega_S$ of the signal light, the frequency $\omega_P$ of the pumping light, and the frequency $\omega_I$ of the idler light satisfy the following relationship.

$$\omega_P - \omega_I = \omega_S - \omega_P \neq 0$$

Here, assume that the length of an optical fiber and its loss is "L" and "$\alpha$" respectively when optical fibers are used as the nonlinear optical media 1 and 2. Also assume that the polarization states of all optical waves are identical in the optical fibers, and the input power $P_P$ of the pumping light is sufficiently higher than the power of the signal light and that of the idler light. For example, if the wavelength $\lambda_P$ of the pumping light is adjusted to a zero dispersion wavelength $\lambda_0$ of the optical fiber, the signal light output from the optical fiber approximately obtains a gain $G_S$ represented by the following equation (1).

$$G_S = \exp(-\alpha L)[1 + \phi^2(L)] \quad (1)$$

$$\phi(L) = \gamma P_P(0) l(L) \quad (2)$$

$$\gamma = \frac{\omega n_2}{c A_{\mathit{eff}}} \quad (3)$$

where "$\phi(L)$" represents a nonlinear optical phase shift, and "$P_P(0)$" represents the input power of the pumping light.

$$[l(L) = (1-e^{-\alpha L})/\alpha L]$$

represents the effective length of interaction. "$\gamma$" represents a third-order nonlinear coefficient. "$n_2$" and "$A_{\mathit{eff}}$" respectively represent the nonlinear refractive index and the effective cross-sectional area of the optical fiber.

As represented by the above provided equations (1) to (3), the optical parametric gain $G_S$ nonlinearly changes with the value of a product of the nonlinear coefficient, the input power of the pumping light, and the effective length of interaction. Especially, if a condition $\lambda_P = \lambda_0$ is satisfied, the gain $G_S$ is approximately proportional to the square of the value of the product as represented by the equation (1). Here, the generation efficiency of the optical parametric effect significantly depends on the polarization state of interacting light waves. Specifically, the generation efficiency of four-wave mixing becomes maximum if the polarization states of light waves input to the optical fiber are mutually identical. Or, the four-wave mixing hardly occurs if the polarization states of light waves are mutually orthogonal. Accordingly, if the input power of the pumping light is sufficiently high, the signal light is selectively and parametrically amplified when the signal light has the same polarization direction as the pumping light.

The optical parametric amplification is implemented, for example, by four-wave mixing within a third-order nonlinear optical medium such as an optical fiber, etc. The optical parametric amplification can be implemented also by three-wave mixing within a second-order nonlinear medium such as an $LiNbO_3$ (Periodically-poled LN) waveguide, etc. of a polarized inverse structure (quasi phase matched structure).

In the above described model, if the input power of the signal light input to the optical fiber is increased and the power $P_P$ of the pumping light does not sufficiently become higher than the power $P_S$ of the signal light, the optical gain $G_S$ is gradually saturated (namely, decreases). Especially, if the power of the pumping light is consumed to produce the optical parametric effect and the state called "depletion" where the power itself of the pumping light decreases within the optical fiber occurs, the optical gain is rapidly saturated.

If the depletion of the pumping light occurs in a nonlinear optical medium, the gain of the nonlinear optical medium is saturated. As a result, the power of signal light output from the nonlinear optical medium does not become higher than a certain level even if the input power of the signal light is increased, and the nonlinear optical medium operates as a so-called optical limiter amplifier. In the optical limiter amplifier, the output power of the signal light is constant even if the input power of the signal light fluctuates. Therefore, optical waveform shaping for suppressing intensity noise that fluctuates the intensity of an optical signal (especially suppressing the noise of level "1") can be implemented. The intensity noise is also called amplitude noise. Accordingly, in the optical waveform shaping devices according to the embodiments, the optical limiter amplifier is implemented by increasing the input power of the signal light to a level at which the depletion of the pumping light occurs.

As described above, in the optical signal processing device 100 according to the embodiments, the operation of the optical limiter amplifier is implemented by adjusting the powers of pumping light and signal light when the signal light (or WDM light) is amplified (for example, parametrically amplified). With the operation of the optical limiter amplifier, fluctuations in the amplitude of an optical signal are suppressed. Namely, waveform shaping and/or amplitude noise suppression can be implemented.

At this time, the signal light is parametrically amplified with almost identical gains in mutually orthogonal polarization directions (s-polarization and p-polarization) in the nonlinear optical media 1 and 2. Accordingly, the amplification, and the operation of the optical limiter amplifier (including waveform shaping) can be implemented without depending on the polarization state of signal light.

First Embodiment

Figure 3:
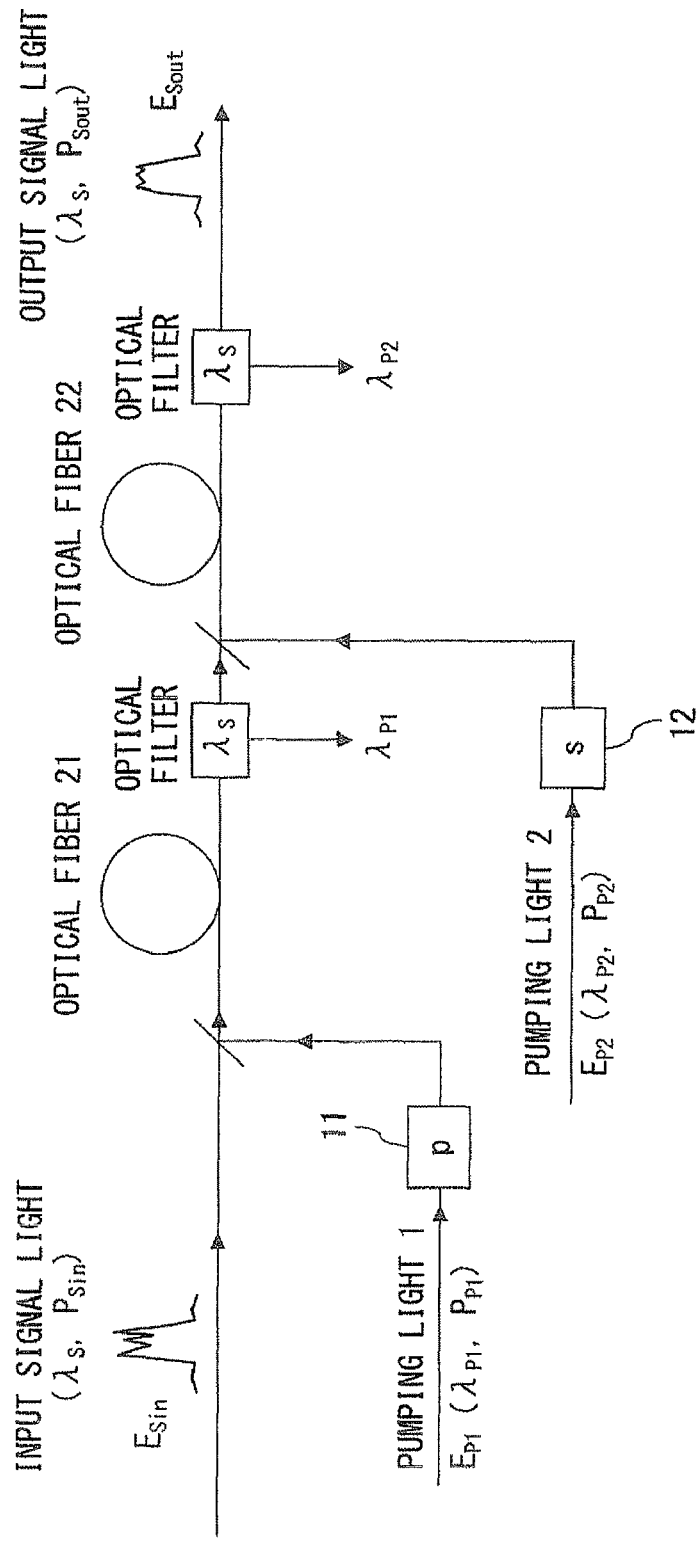
FIG. 3 illustrates a configuration of an optical signal processing device according to a first embodiment.

FIG. 3 illustrates a configuration of an optical signal processing device according to a first embodiment. The basic configuration of the optical signal processing device according to the first embodiment is the same as the optical signal processing device illustrated in FIG. 1. However, optical fibers 21 and 22 are respectively used as the nonlinear optical media 1 and 2 in the first embodiment.

The input powers of the signal light ($E_S$), the pumping light ($E_{P1}$) and the pumping light ($E_{P2}$) are respectively controlled by power controllers. The power controllers are respectively implemented, for example, with an optical amplifier or an optical attenuator. Alternatively, the power controllers may be implemented by combining an optical amplifier and an optical attenuator. At this time, the powers of the pumping lights 1 and 2 are controlled, for example, to generate mutually identical or almost identical optical parametric gains in the optical fibers 21 and 22. Moreover, the wavelengths of the pumping lights 1 and 2 are set to produce a sufficient optical parametric effect for the signal light.

The wavelength of the signal light output from the optical fibers 21 and 22 is "$\lambda_S$", and remains unchanged as the signal light input to the optical fibers 21 and 22. At the output sides of the optical fibers 21 and 22, an optical filter for extracting the wavelength component of the signal light is provided if necessary.

In the optical signal processing device configured as described above, the signal light is amplified with the pumping lights 1 and 2 in the optical fibers 21 and 22. If the powers of the pumping lights 1 and 2 are increased, an optical parametric gain generated by the optical parametric effect can be obtained. Here, the pumping light 1 is provided to the optical fiber 21 after being controlled by the polarization controller 11 to be p-polarization. Accordingly, the signal light is parametrically amplified mainly in the p-polarization direction in the optical fiber 21. Similarly, the pumping light 2 is provided to the optical fiber 22 after being controlled by the polarization controller 12 to be s-polarization. Accordingly, the signal light is parametrically amplified mainly in the s-polarization direction in the optical fiber 22. Therefore, the optical parametric amplification in the optical signal processing device according to this embodiment does not depend on the polarization state of the signal light.

Amplification in the optical fibers 21 and 22 is described. Here, amplification operations in the optical fibers 21 and 22 are fundamentally the same. Accordingly, amplification is hereinafter described as that in the nonlinear optical medium.

Assuming that the input power of signal light and a power gain are "$P_{Sin}$" and "$G_S$" respectively in the nonlinear optical medium (namely, the optical fiber 21 or 22), the output power $P_{Sout}$ of the signal light is represented by the following equation.

$$P_{Sout} = G_S \cdot P_{Sin}$$

If the gain $G_S$ is made larger than "1", the power of the signal light is amplified. For example, by adjusting the length of the optical fiber 21 or 22 and the power $P_P$ of the pumping light, a sufficiently large gain $G_S$ can be obtained. At this time, an optical limiter amplifier that makes the output power of the nonlinear optical medium constant (or suppresses power fluctuations) regardless of the polarization state of the signal light can be implemented by saturating the gain $G_S$ in the nonlinear optical medium. With this optical limiter amplifier, waveform shaping for suppressing, for example, intensity noise can be made. The response time of the optical parametric amplification within the optical fiber is very short (several femto seconds order), and waveform shaping for an ultra high-speed signal exceeding tera bps can be expected.

Figure 4A:
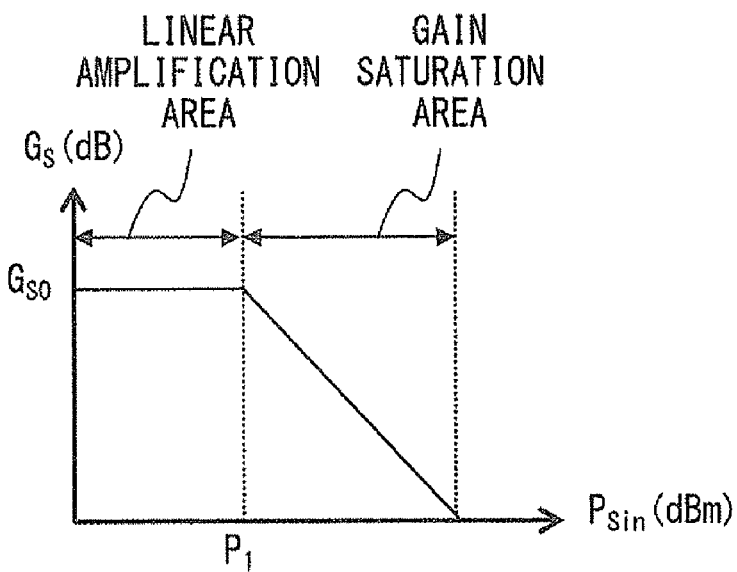
FIGS. 4A and 4B illustrate relationships between a gain of a nonlinear optical medium and signal light.
Figure 4B:
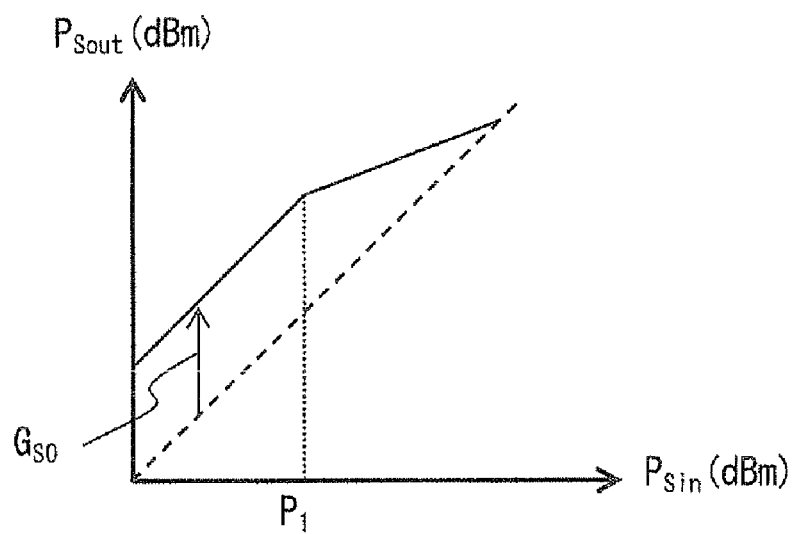

FIGS. 4A and 4B illustrate relationships between a gain obtained in the nonlinear optical medium and the signal light. FIG. 4A illustrates the relationship between the input power of the signal light and the gain, whereas FIG. 4B illustrates the relationship between the input power and the output power of the signal light. Assume that the power of the pumping light is constant in FIGS. 4A and 4B. If the power $P_{Sin}$ of the signal light is low, the gain (for example, the optical parametric gain) $G_S$ is constant ("$G_{S0}$" in FIG. 4A). In this case, the signal light input to the nonlinear optical medium is linearly amplified.

In the meantime, in an area where the power $P_{Sin}$ of the signal light is higher than threshold power $P_1$, the optical parametric gain $G_S$ is saturated. Namely, the gain obtained in the nonlinear optical medium decreases in the area where the power $P_{Sin}$ of the signal light is higher than the threshold power $P_1$, compared with the area where the power $P_{Sin}$ of the signal light is lower than the threshold power $P_1$.

In the optical signal processing device according to the embodiment, the nonlinear optical medium is used in a linear amplification area by keeping the power of the signal light at low level when linear amplification is made, or the nonlinear optical medium is used in a gain saturation area by suitably controlling the power of the signal light when the optical limiter operations are performed. In this case, the power of the signal light input to the nonlinear optical medium is adjusted to a level equal to or higher than the threshold power $P_1$ illustrated in FIGS. 4A and 4B.

Figure 5:
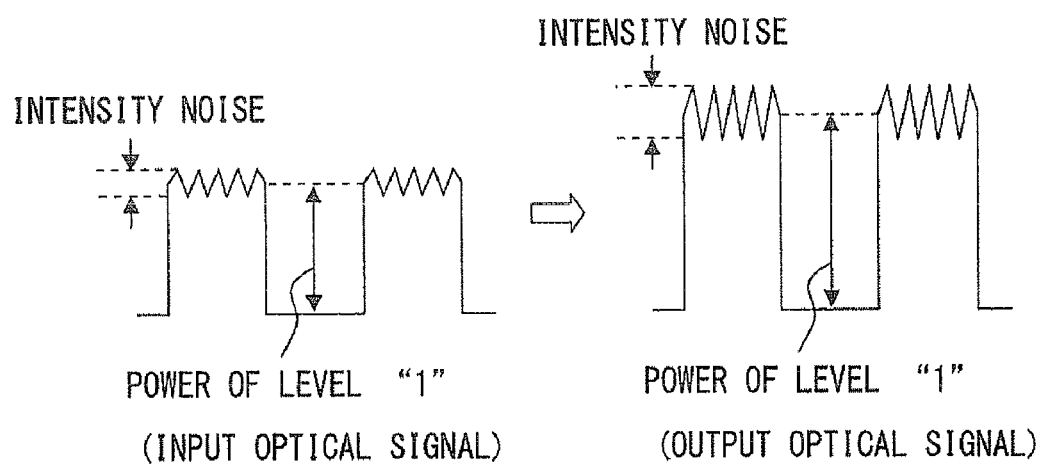
FIG. 5 explains operations performed when the nonlinear optical medium is used in a linear amplification area.

FIG. 5 illustrates operations performed when the nonlinear optical medium is used in the linear amplification area. Here, assume that the power of the pumping light is constant. Also assume that the power of the signal light is controlled to be a certain level smaller than the threshold power $P_1$ illustrated in FIGS. 4A and 4B. In this case, an optical signal input as the signal light is linearly amplified. Namely, when the optical signal is amplified with the gain $G_S$, also intensity noise on the optical signal is similarly amplified with the gain $G_S$. Accordingly, a waveform shaping effect or a noise suppression effect cannot be produced.

Figure 6:
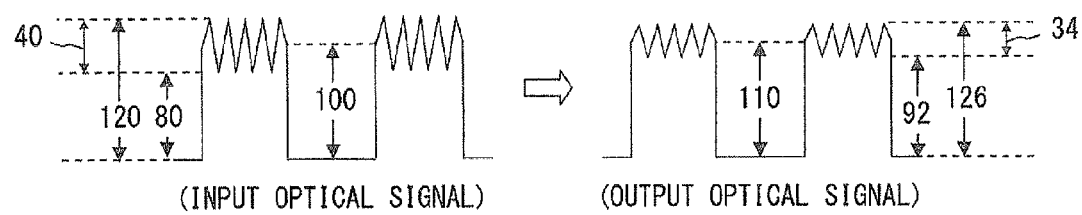
FIG. 6 explains operations performed when the nonlinear optical medium is used in a gain saturation area.

FIG. 6 explains operations performed when the nonlinear optical medium is used in the gain saturation area. Here, assume that the power of the pumping light is constant. Also assume that the power of the signal light is controlled to be equal to or larger than the threshold power $P_1$ illustrated in FIGS. 4A and 4B. Numerical values assigned in FIG. 6 represent optical powers. However, these numerical values are intended to merely explain the operations of the optical signal processing device according to the embodiment, and strictness or accuracy is not taken into account.

In the example illustrated in FIG. 6, the average power (or the power of level "1" of the optical signal) of the optical pulse signal input as the signal light is "100". Moreover, the power of the optical pulse signal fluctuates in a range from 80 to 120. Namely, the magnitude of the intensity noise is "40". Here, the gain of the nonlinear optical medium is saturated. Accordingly, the gain received by the optical signal decreases with an increase in the power of the optical signal. For ease of explanation, the gain generated when the input power of the optical signal is "80", "100" and "120" is assumed to be "1.15", "1.10", and "1.05" respectively in the example illustrated in FIG. 6. In this case, the average power of the optical pulse signal output from the nonlinear optical medium is "110". However, the amplification rate of the signal component the input power of which is higher than "100" is smaller, and the amplification rate of the signal component the input power of which is lower than "100" is larger. As a result, fluctuations in the power of the optical pulse signal output from the nonlinear optical medium falls within a range from "92" to "126". Namely, the magnitude of the intensity noise is suppressed to "34". Considering that the total power is amplified by 1.1 times, intensity fluctuations are reduced from 40 percent to 31 percent.

As described above, in the optical signal processing device according to this embodiment, the nonlinear optical medium is controlled to be in the gain saturation state by adjusting the power of the signal light. Namely, the nonlinear optical medium operates as the optical limiter amplifier. The signal light is input to the nonlinear optical medium controlled to be in the gain saturation state. Since the intensity noise is suppressed in a time domain in which the optical signal indicates "1", the waveform of the optical signal is shaped.

Additionally, in the optical signal processing device according to the embodiment, the cascade-connected optical fibers 21 and 22 are used as the nonlinear optical media, and p-polarization pumping light and s-polarization pumping light are respectively provided to the optical fibers 21 and 22. Therefore, waveform shaping and/or improvements in the optical S/N ratio can be realized regardless of the polarization of signal light.

<Nonlinear Optical Medium>

In the optical signal processing device illustrated in FIG. 3, the optical fibers 21 and 22 are used as nonlinear optical media. The optical fibers 21 and 22 are nonlinear optical fibers. The optical fibers 21 and 22 have, for example, mutually identical characteristics although they are not particularly limited. Moreover, the lengths of the optical fibers 21 and 22 are determined so that desired optical parametric amplification efficiency can be obtained or an optical limiter effect is optimized. To secure the bandwidth of the optical parametric amplification to be sufficiently wide, phase matching method may be applied, for example, by making the wavelengths of the pumping lights ($\lambda_{P1}$, $\lambda_{P2}$) match or nearly match the zero dispersion wavelength ($\lambda_0$) of the optical fibers 21 and 22. Alternatively, phase matching may be made by setting the wavelengths of the pumping lights to a wavelength longer than the zero dispersion wavelength of the optical fibers 21 and 22, and by using a nonlinear phase shift. In this case, for example, the value of the product of the chromatic dispersion of the wavelength of pumping light and a difference between the frequencies of the signal light and the pumping light may be made to nearly match a doubled value of the product of the nonlinear optical coefficient of the optical fiber, the power of the pumping light, and the effective interaction length of the optical fiber. With these configurations, the efficiency of the optical parametric amplification can be increased.

As the optical fiber 21 or 22, for example, a highly nonlinear fiber (HNLF), the nonlinear optical effect of which is enhanced, is effective. Additionally, a configuration of improving a nonlinear refractive index by doping a core with germanium, etc., a configuration of improving an optical power density by downsizing a mode field, or a configuration using a bismuth glass fiber and waveguide, a chalcogenide glass fiber and waveguide, or a photonic crystal structure may be adopted.

As other nonlinear optical media, a semiconductor optical amplifier of a quantum well structure, a semiconductor optical amplifier of a quantum dot structure, a silicon photonics waveguide, a silicon wire, etc. are available. Also a device for producing a second-order nonlinear optical effect such as three-wave mixing, etc. is available as still other nonlinear optical media. In this case, for example, an $LiNbO_3$ waveguide (PPLN) having a quasi phase matching structure, a GaAlAs element, a second-order nonlinear optical crystal, etc. are available as these devices. A configuration of making wavelength allocation that enables phase matching is preferable even when a second-order nonlinear medium is used.

<Pumping Light Source>

Pumping light may be CW light or an optical pulse. If the pumping light is CW light, there is no need to control the timing of an optical signal carried by signal light. Therefore, an optical signal processing device can be implemented with a simple configuration. However, the production efficiency of nonlinear optical effect depends on the peak power of pumping light. Accordingly, to secure a sufficient gain, for example, sufficiently amplified pumping light is input to the optical fibers 21 and 22. If stimulated Brillouin scattering (SBS) occurs, input pumping light is reflected, which restricts the generation of optical parametric amplification. SBS can be suppressed by introducing a configuration for providing a temperature distribution in the longitudinal direction of the optical fiber, or a configuration for expanding the spectrum of pumping light. The spectrum of pumping light can be expanded, for example, by making phase modulation or frequency modulation of a frequency lower than a signal carried by the signal light.

If the pumping light is an optical pulse, its peak power can be easily increased. Therefore, a large gain can be implemented. With this configuration, however, it is necessary to match the timings of an optical signal and a pumping light pulse. Therefore, a timing recovery circuit, etc. is required.

To avoid this matter, a configuration of using as pumping light an optical pulse train of a repetition frequency sufficiently higher than the bit rate of an optical signal is considered. In this case, the pumping light is generated, for example, by a semiconductor mode-locked laser or a fiber mode-locked laser, which oscillates at a desired repetition frequency. Alternatively, the pumping light may be generated by an $LiNbO_3$ modulator or an electronic absorption (EA) modulator.

If the pumping light is an optical pulse train, it is preferable that the time average of a gain provided to an optical signal is almost constant. In this case, the pumping light pulse may be generated at predetermined time intervals. If not, it does not matter. Namely, the optical parametric effect can be produced even if the pumping light pulse is not synchronous with the timing of an optical signal.

Second Embodiment

To generate sufficient gain saturation for every polarization state of signal light, pumping light in a polarization state of another direction may be used in addition to the above described one pair of mutually orthogonal pumping lights. Here, a configuration further using another pair of pumping lights $E_{P3}$ and $E_{P4}$, the polarization direction of which is 45 degrees from the pumping lights $E_{P1}$ and $E_{P2}$, is described.

Figure 7:
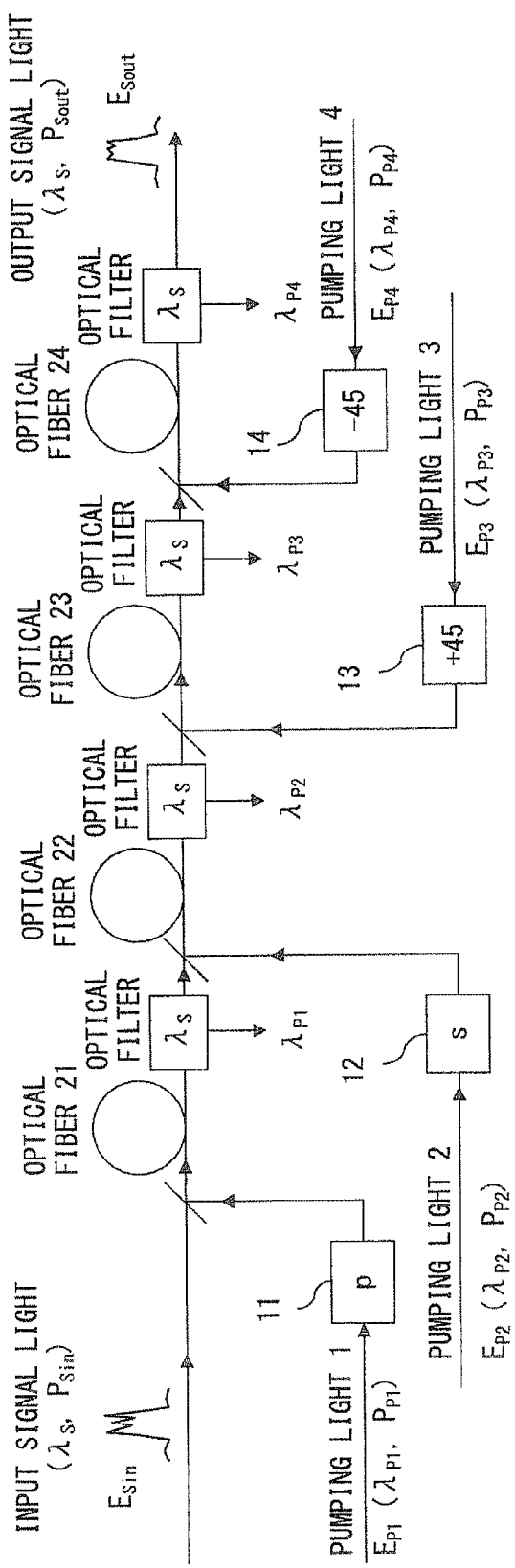
FIG. 7 illustrates a configuration of an optical signal processing device according to a second embodiment.

FIG. 7 illustrates a configuration of an optical signal processing device according to the second embodiment. The optical signal processing device according to the second embodiment includes cascade-connected optical fibers 21 to 24. All of the optical fibers 21 to 24 are nonlinear optical fibers, and have the same characteristic in this embodiment.

To the optical fibers 21, 22, 23 and 24, pumping light 1 ($E_{P1}$), pumping light 2 ($E_{P2}$), pumping light 3 ($E_{P3}$) and pumping light 4 ($E_{P4}$), which are generated by pumping light sources not illustrated in FIG. 7, are respectively provided. The wavelengths of the pumping lights 1 to 4 may be mutually identical or different. The pumping lights 1 to 4 are respectively controlled by polarization controllers 11 to 14, for example, to be linear polarized lights illustrated in FIG. 8. Namely, they are controlled so that the pumping lights 1 and 2 are mutually orthogonal, and the pumping lights 3 and 4 are mutually orthogonal. They are also controlled so that the pumping light 3 is linear polarized light of +45 degrees from the pumping light 1, and the pumping light 4 is linear polarized light of −45 degrees from the pumping light 1.

At the output side of each of the optical fibers 21 to 24, an optical filter for extracting the wavelength component of signal light is provided. Accordingly, the signal light is parametrically amplified in the polarization direction of corresponding pumping light respectively in the optical fibers 21 to 24.

Figure 8:
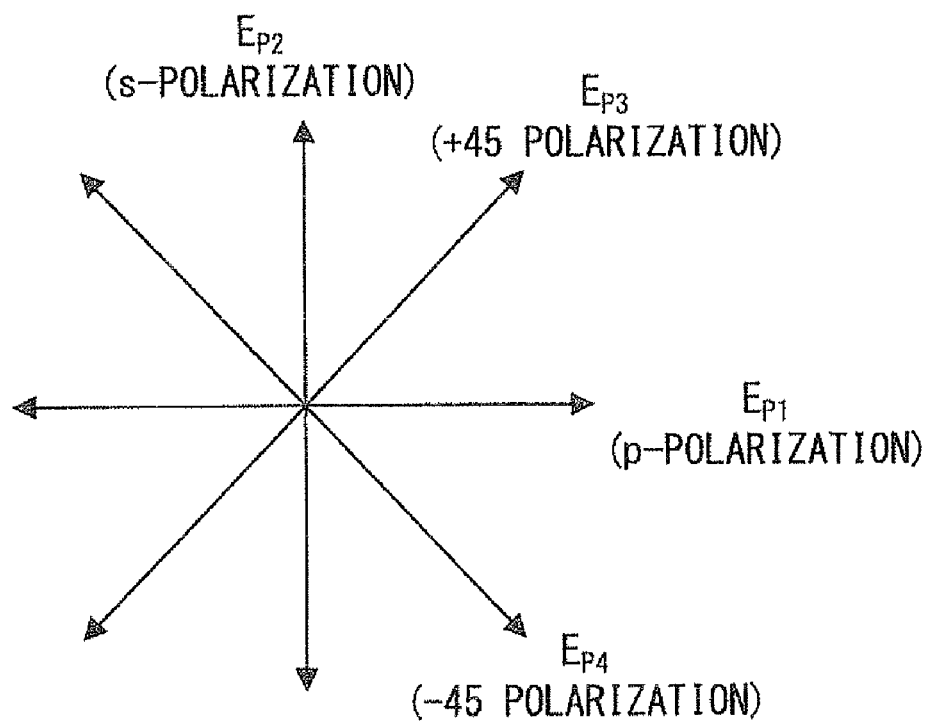
FIG. 8 illustrates the polarization of pumping light in the second embodiment.

With the optical signal processing device according to the second embodiment, fluctuations in the characteristic of signal light, which are caused by a polarization state, can be further suppressed. Namely, in the configuration illustrated in FIG. 3, only one pair of the pumping lights $E_{P1}$ and $E_{P2}$ illustrated in FIG. 8 is used. Therefore, gain saturation becomes relatively low if the polarization direction of signal light forms a large angle with respect to the polarization directions of the pumping lights (for example, if the polarization direction of the signal light forms approximately 45 degrees from both of the pumping lights $E_{P1}$ and $E_{P2}$). In the meantime, in the configuration of the second embodiment, another pair of the pumping lights $E_{P3}$ and $E_{P4}$ is used. Accordingly, since the angle between the polarization direction of the signal light and those of the pumping lights is 22.5 degrees even in the worst case, sufficient gain saturation can be implemented. By preparing pumping lights in other polarization states, more sufficient gain saturation can be implemented for any signal light.

The wavelengths of the pumping lights $E_{P1}$ to $E_{P4}$ may be mutually identical or different. However, they are respectively set to generate a sufficient optical parametric effect for signal light. Moreover, the powers of the pumping lights $E_{P1}$ and $E_{P2}$ are set to generate mutually identical or almost identical optical parametric gains. Similarly, the powers of the pumping lights $E_{P3}$ and $E_{P4}$ are set to generate mutually identical or almost identical optical parametric gains.

Also linear optical parametric amplification, four-wave mixing, three-wave mixing, wavelength conversion, optical phase conjugation, etc., which do not depend on polarization, can be implemented by using the optical signal processing device according to the first or the second embodiment.

Third Embodiment

In the first and the second embodiments, the power of the signal light must be increased to a certain extent in order to implement the optical limiter function. Specifically, the input power $P_{Sin}$ of the signal light must be higher than the threshold power $P_1$ in FIGS. 4A and 4B. However, it is not always possible to make the input power of the signal light higher than the threshold power $P_1$. Especially, the power of each optical signal is low in a WDM system where a plurality of optical signals are carried.

Figure 9:
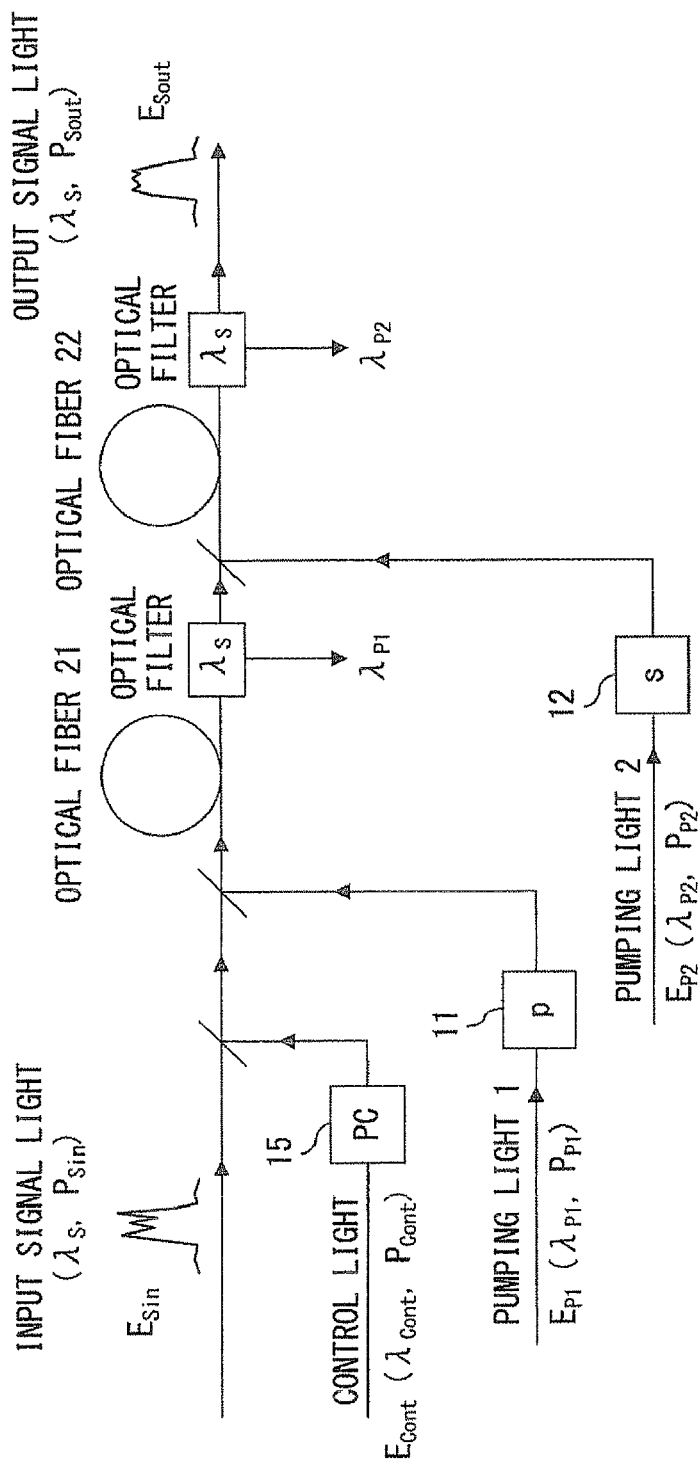
FIG. 9 illustrates a configuration of an optical signal processing device according to a third embodiment.

FIG. 9 illustrates a configuration of an optical signal processing device according to the third embodiment. In this optical signal processing device, control light $E_{Cont}$ is provided to the optical fibers 21 and 22. The wavelength $\lambda_{Cont}$ of the control light is different from the wavelength $\lambda_S$ of the signal light, and the wavelengths $\lambda_{P1}$ and $\lambda_{P2}$ of the pumping lights. In FIG. 9, the control light is provided only to the optical fiber 21. Actually, however, another control light is provided also to the optical fiber 22. In this case, the polarization states and the powers of the control lights input to the optical fibers 21 and 22 may be adjusted, for example, mutually independently.

The power $P_{Cont}$ of the control light is controlled by a power controller so that the depletion of the pumping lights 1 and 2 occurs. Namely, the power of the control light is controlled to exceed the threshold power $P_1$ illustrated in FIGS. 4A and 4B. Alternatively, the power of the control light is controlled so that the sum of the power of the control light and that of the signal light exceeds the threshold power $P_1$ illustrated in FIGS. 4A and 4B.

In the configuration of the third embodiment, the above described control light is used. Therefore, the optical fibers 21 and 22 continuously maintain a gain saturation state regardless of the power of the signal light. Namely, the optical limiter function can be continuously obtained. Accordingly, intensity noise is suppressed even if the power of the signal light is low. Moreover, the intensity noises of optical signals of a plurality of channels carried by WDM light can be suppressed even if their powers are different. Namely, the waveforms of the plurality of optical signals are collectively shaped.

The control light is controlled by a polarization controller 15 to realize an optimum limiter characteristic. For example, if the signal light is in a polarization state around p-polarization or s-polarization, the control light is controlled to be orthogonal to the signal light. In contrast, if the signal light is not in a linearly-polarized state, the control light is controlled to be a polarization state in which the power may be equally provided to p-polarization and s-polarization. At this time, the polarization controller 15 may perform feedback control for the polarization state of the control light while monitoring the polarization state of the signal light. Alternatively, the polarization controller 15 may control the polarization state of the control light to form 45 degrees from the polarization direction of the pumping light 1 and that of the pumping light 2. Note that separate control lights may be provided to the optical fibers 21 and 22.

The control light may be CW light or an optical pulse train. Or, CW light and an optical pulse train may be used as the pumping light and the control light, respectively. Alternatively, an optical pulse train and CW light may be used as the pumping light and the control light, respectively. Especially, if the above described optical pulse train is used as the control light with the use of CW light as the pumping light, the gain of each of the optical fibers 21 and 22 is saturated in a time domain where the optical pulse of the control light exists, and its intensity noise is suppressed.

<Basic Configuration According to Another Aspect>

FIGS. 10A and 10B illustrate a configuration of an optical signal processing device according to another aspect. An optical signal processing device 200 illustrated in FIG. 10A includes a nonlinear optical medium 30, a polarization beam splitter 41, and a polarization controller 42. The nonlinear optical medium 30 is basically the same as the nonlinear optical medium 1 or 2 illustrated in FIG. 1, and signal light and pumping light are input.

The polarization beam splitter 41 has ports a to d as illustrated in FIG. 10B. The polarization beam splitter 41 splits the input light of the port a into mutually orthogonal linear polarized lights, and guides the polarized lights to the ports b and c. The input lights of the ports b and c are polarization-coupled and guided to the port d. The nonlinear optical medium 30 is provided between the ports b and c of the polarization beam splitter 41. Moreover, the polarization controller 42 controls the polarization state of the pumping light to be input to the nonlinear optical medium 30.

In the optical signal processing device 200 configured as described above, the signal light $E_S$ and the pumping light $E_P$ are guided to the port a of the polarization beam splitter 41.

The polarization beam splitter 41 guides the p-polarization component and the s-polarization component of the input light of the port a to the ports c and b, respectively. Namely, the p-polarization component of the signal light $E_S$ and that of the pumping light $E_P$ are output from the port c, and propagated to the port b via the nonlinear optical medium 30. In contrast, the s-polarization component of the signal light $E_S$ and that of the pumping light $E_P$ are output from the port b, and propagated to the port c via the nonlinear optical medium 30. As described above, the p-polarization components of the signal light and the pumping light, and the s-polarization components of the signal light and the pumping light are propagated in mutually opposite directions in the nonlinear optical medium 30.

Here, one pair of pumping lights (namely, the p-polarization and the s-polarization of the pumping light) transmit in mutually orthogonal polarization states in opposite directions in the nonlinear optical medium 30. Accordingly, the p-polarization of the signal light is hardly affected by the s-polarization of the pumping light, whereas the s-polarization of the signal light is hardly affected by the p-polarization of the pumping light. Accordingly, the p-polarization of the signal light is parametrically amplified substantially only by the p-polarization of the pumping light. Similarly, the s-polarization of the signal light is parametrically amplified substantially only by the s-polarization of the pumping light. Namely, essentially the same effect as the optical signal processing device 100 illustrated in FIG. 1 can be obtained, and the optical parametric amplification and the optical limiter, which do not depend on the polarization state of signal light, can be implemented.

The polarization controller 42 controls the polarization state of the pumping light so that the pumping light is split by the polarization beam splitter 41 into almost equal polarization components (p component and s component). At this time, the polarization controller 42 may control the polarization state of the pumping light in advance, or may perform feedback control, etc. for the polarization state. Moreover, the number of light sources for generating pumping light may be only one. Furthermore, it is preferable that the nonlinear optical medium 30 maintains the polarization state of propagating light. To maintain the polarization state, a polarization controller, etc. not illustrated may be used if necessary.

Fourth Embodiment

FIG. 11 illustrates a configuration of an optical signal processing device according to a fourth embodiment. In the fourth embodiment, the nonlinear optical medium 30 illustrated in FIGS. 10A and 10B is implemented with an optical fiber 31. In this case, the optical fiber 31 may be configured, for example, by combining a single-mode nonlinear optical fiber and a polarization controller, or by using a polarization maintaining fiber.

With the configuration according to the fourth embodiment, the numbers of optical fibers for parametric amplification, light sources for generating pumping light, polarization controllers for controlling the polarization state of pumping light, and optical filters for extracting signal light can be reduced in comparison with the configuration illustrated in FIG. 3.

<Modification Example (1) of the Fourth Embodiment>

Figure 12:
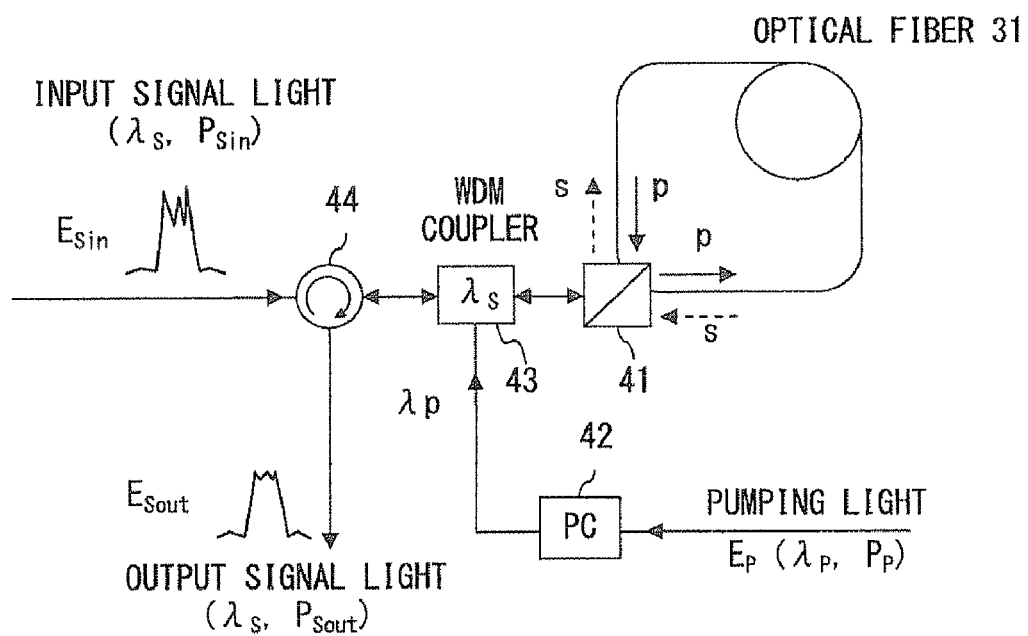
FIG. 12 illustrates a modification example of the fourth embodiment.

FIG. 12 illustrates a modification example of the fourth embodiment. In the configuration illustrated in FIG. 12, signal light and pumping light are coupled by using a WDM coupler 43. Here, the signal light is guided to the WDM coupler 43 via an optical circulator 44. In the meantime, the pumping light is guided to the WDM coupler 43 after its polarization state is controlled by the polarization controller 42. The coupled light obtained by the WDM coupler 43 is split by the polarization beam splitter 41 into mutually orthogonal linear polarized lights. One pair of polarization components obtained by the polarization beam splitter 41 is polarization-coupled by the polarization beam splitter 41 after being propagated in mutually opposite directions through the optical fiber 31.

The coupled light output from the polarization beam splitter 41 is guided to the WDM coupler 43. The WDM coupler 43 transmits the wavelength component $\lambda_S$ of the signal light and eliminates the wavelength component $\lambda_P$ of the pumping light. Accordingly, the signal light is extracted by the WDM coupler 43, and guided to the optical circulator 44. As a result, the parametrically amplified signal light is output.

In the above described configuration, the optical filter function is implemented by using the WDM coupler for coupling the signal light and the pumping light. An optical circulator and a WDM coupler, the optical loss of which is very small, are commercially available. Accordingly, an optical circuit the optical loss of which is reduced can be simplified by introducing the configuration illustrated in FIG. 12. Note that the polarization states of the signal light and the pumping light are controlled by using a polarization controller, etc. not illustrated in FIG. 12 so that one pair of polarization components split by the polarization beam splitter 41 return to the polarization beam splitter 41 in their mutually orthogonal states.

<Modification Example (2) of the Fourth Embodiment>

Figure 13:
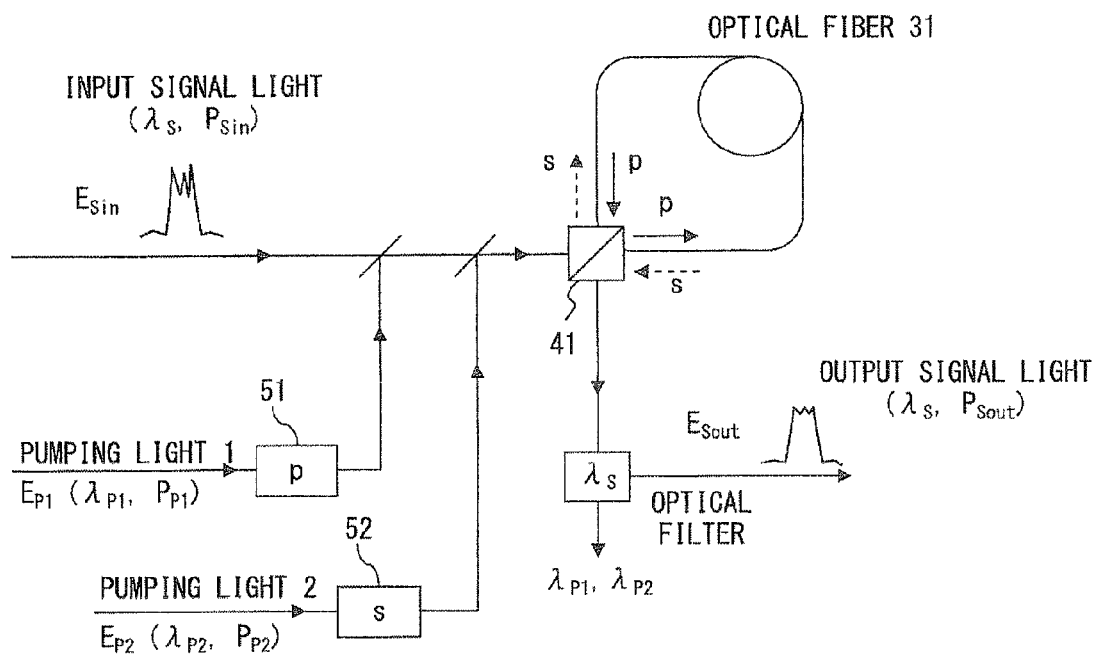
FIG. 13 illustrates another modification example of the fourth embodiment.

FIG. 13 illustrates another modification example of the fourth embodiment. In the configuration illustrated in FIG. 13, one pair of pumping lights 1 and 2 is prepared. Here, the pumping lights 1 and 2 may be generated by different light sources. The pumping light 1 is controlled by a polarization controller 51 to be p-polarization, whereas the pumping light 2 is controlled by a polarization controller 52 to be s-polarization. The polarization-controlled pumping lights 1 and 2 are provided to the optical fiber 31 in a similar manner as in the above described embodiment. In this case, the pumping light 1 controlled by the polarization controller 51 is propagated counterclockwise through the optical fiber 31. The pumping light 2 controlled by the polarization controller 52 is propagated clockwise through the optical fiber 31. With this configuration, the power of the pumping light for each polarization component can be easily increased. To further increase the power of the pumping light, a configuration where the pumping light 1 is input from the exit of the port c of the polarization beam splitter 41 to the optical fiber 31, and the pumping light 2 is input from the exit of the port b of the polarization beam splitter 41 to the optical fiber 31 may be used. In this case, a method for inputting the pumping lights with a WDM coupler is effective, and the pumping lights 1 and 2 are respectively adjusted to p-polarization and s-polarization by using the polarization controllers 51 and 52.

Fifth Embodiment

Figure 14:
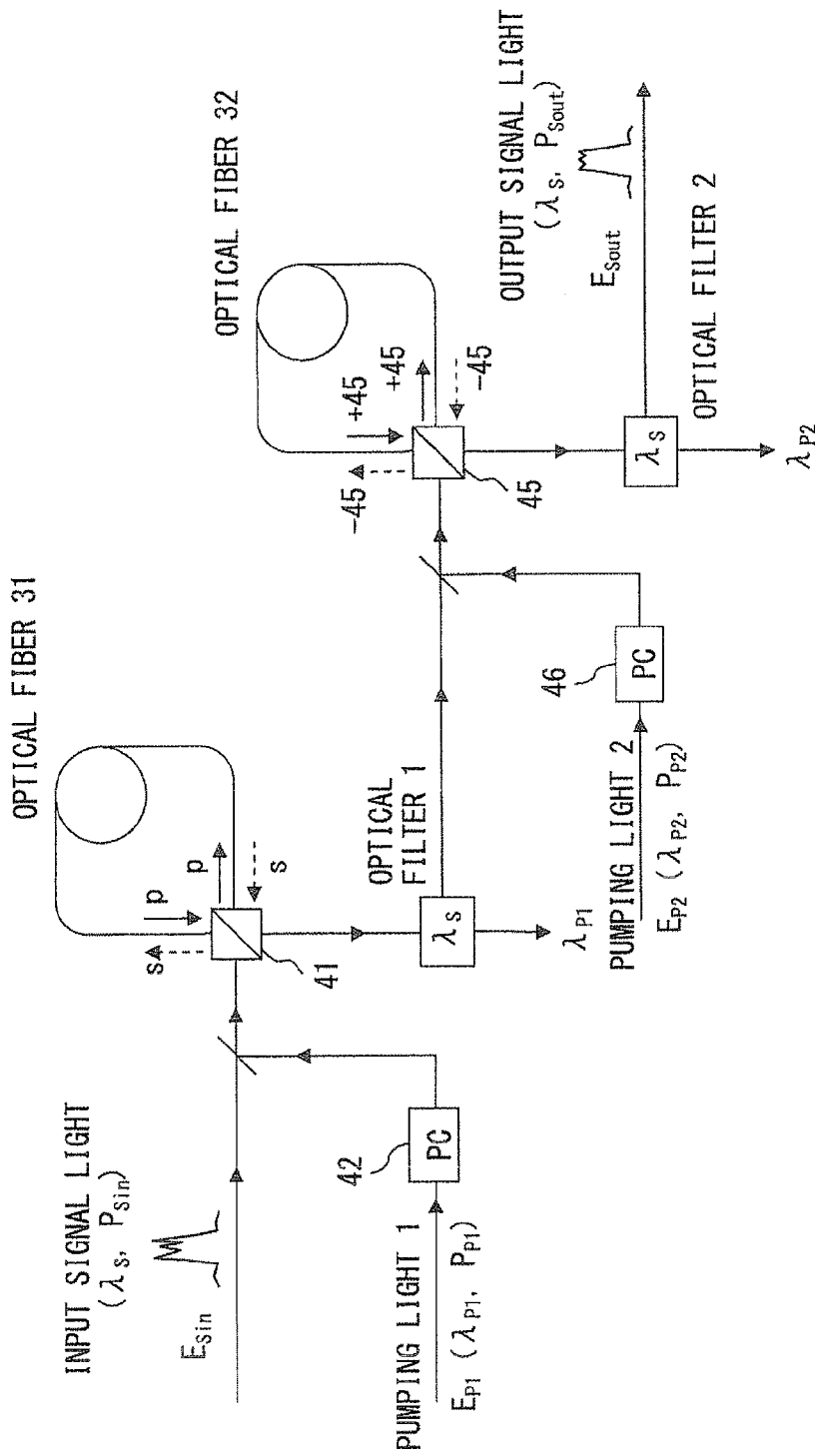
FIG. 14 illustrates a configuration of an optical signal processing device according to a fifth embodiment.

FIG. 14 illustrates a configuration of an optical signal processing device according to a fifth embodiment. The optical signal processing device according to the fifth embodiment is implemented by cascade-connecting the optical circuits illustrated in FIG. 11. Namely, the optical circuit at the second stage has an optical fiber 32, a polarization beam splitter 45, and a polarization controller 46. However, the polarization of pumping light used in the optical circuit at the second stage differs by approximately 45 degrees from the polarization of pumping light used in the optical circuit at the first stage. For example, if the polarization beam splitter 41 by which the p-polarization and the s-polarization, which are illustrated in FIG. 8, are obtained is provided in the optical circuit at the first stage, the polarization beam splitter 45 by which the +45 polarized light and the −45 polarized light can be obtained is provided in the optical circuit at the second stage. With this configuration, an effect equivalent to the optical signal processing device illustrated in FIG. 7 can be implemented. A polarization controller for controlling the polarization of signal light may be provided between the optical circuit at the first stage and that at the second stage, although this is not illustrated.

Sixth Embodiment

Figure 15:
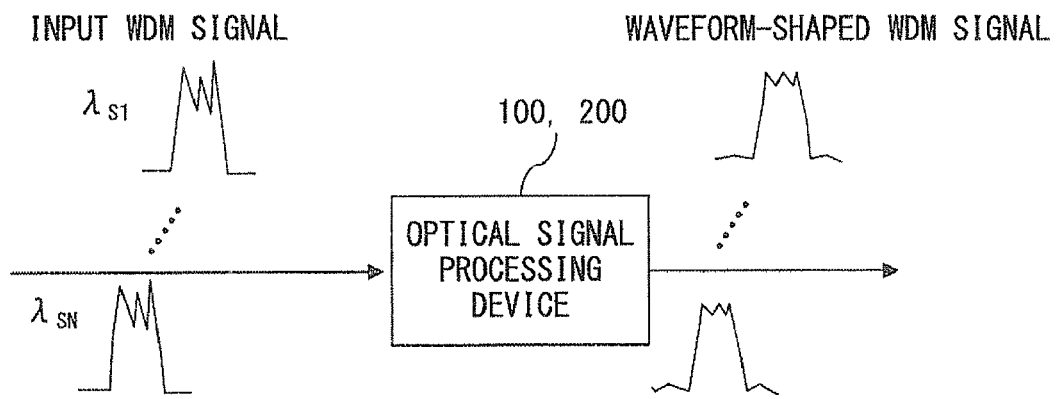
FIG. 15 illustrates a configuration for processing WDM light.

In the sixth embodiment, signal light where a plurality of signals are wavelength-division multiplexed (WDM) is input to the optical signal processing device 100 (200) as illustrated in FIG. 15. The optical signal processing device 100 is, for example, as described in the first to the fifth embodiments.

Generally, Optical signals carried by WDM light are not synchronous with one another, and their polarization states are at random. Moreover, the total sum of the peak powers of the optical signals is not constant in a time domain. Accordingly, in the conventional technology, the waveform of each optical signal is shaped after splitting for each channel (namely, for each wavelength) from the WDM light is shaped.

In contrast, in the optical signal processing device according to this embodiment, the intensity noise of an optical signal is suppressed and the waveform of the optical signal is shaped without being affected by the input power of signal light. Accordingly, the waveform of each optical signal can be shaped without splitting WDM light into channels in the optical signal processing device according to this embodiment.

At the output end of the optical signal processing device, an optical bandpass filter having a transmission band in the neighborhood of the center of each wavelength of the WDM signal light may be provided. In this case, for example, a combination of an inter-leaver filter and a fiber grating, or the like is effective. Also a band reject optical filter for cutting off a wavelength component other than those of the WDM signal light may be provided at the output end of the optical signal processing device.

Seventh Embodiment

Gain saturation depends on the total sum of the peak powers of all channels of WDM signal light at the same timing. Accordingly, averaging the total sum of the peak powers at the same timing is effective to generate gain saturation for all the signals on the average.

Figure 16:
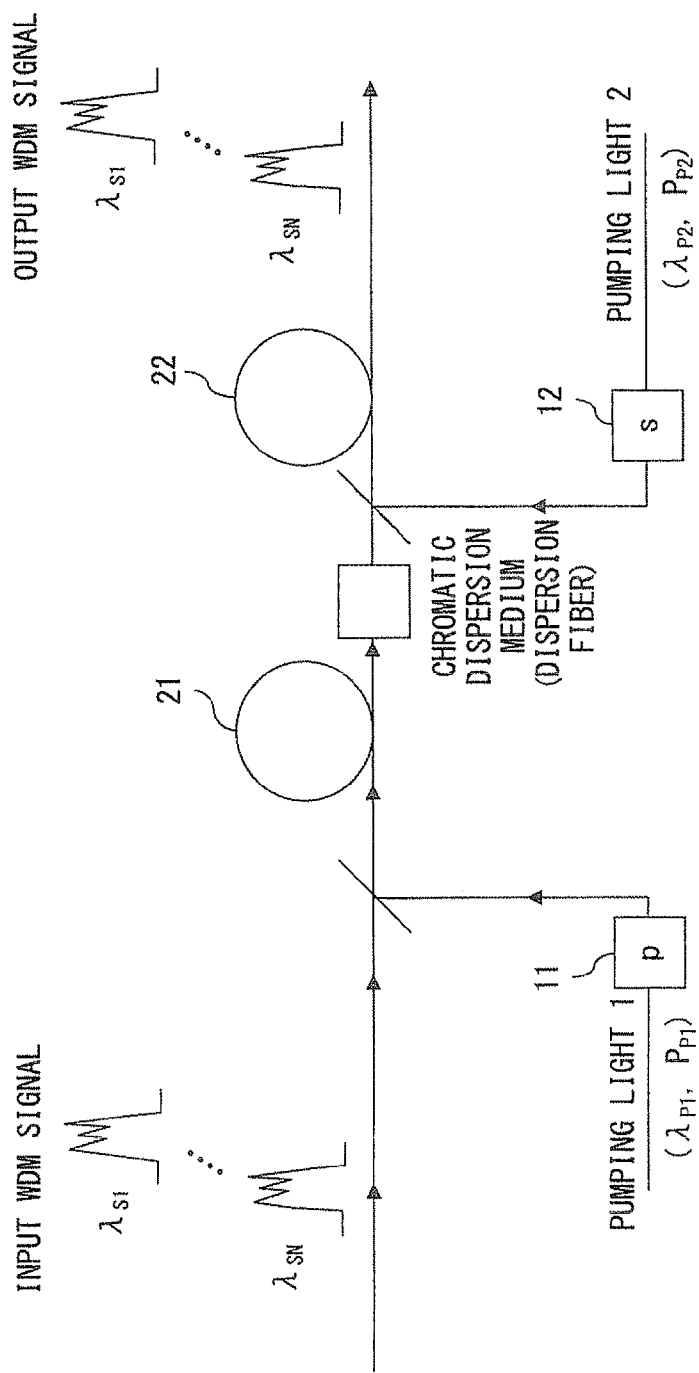
FIG. 16 illustrates a configuration for providing different delays with respect to wavelengths.

FIG. 16 illustrates a configuration for providing different delays respectively to wavelengths between the optical fibers 21 and 22. The configuration for providing different delays to signal light of different wavelengths can be implemented, for example, by using a chromatic dispersion medium (delay medium). This configuration is implemented, for example, with a dispersion fiber (or an optical fiber providing a different group velocity to light of a different wavelength). By way of example, for a 100-Gbps WDM signal of two channels separated by 10 nm, the two channels can be averaged by providing a delay of 5 ps between the two channels. In this case, for example, an optical fiber of approximately 25 m, the chromatic dispersion of which is about 20 ps/nm/km, may be used.

With the above described configuration, linear optical parametric amplification, four-wave mixing, three-wave mixing, wavelength conversion, optical phase conjugation, etc., which do not depend on polarization, can be implemented.

Eighth Embodiment

In the optical signal processing device according to the embodiments, the phase of signal light is not affected while being amplified within the optical fibers (21 to 24, 31, 32). Accordingly, the above described waveform shaping method can be applied to signal light modulated with optical intensity modulation, optical phase modulation, optical frequency modulation, or the like.

For signal light modulated with optical phase modulation, the phase noise itself is not suppressed by the optical limiter amplifier. However, the optical limiter amplifier is effective at reducing the phase noise caused by intensity fluctuations by suppressing the intensity fluctuations. Especially, in an optical fiber transmission, intensity noise is converted into phase noise (AM/PM conversion) with a nonlinear optical effect within an optical fiber. The transmission limit of signal light modulated with optical phase modulation depends on the phase noise. Accordingly, phase noise caused by AM/PM conversion is reduced by suppressing intensity noise with the optical signal processing device according to the embodiments, thereby improving the quality of the signal light modulated with optical phase modulation, and signal light can be transmitted with high quality.

Fluctuations in the zero level can be suppressed, for example, by arranging a saturable absorber at input side or output side of the optical signal processing device according to the embodiment. As the saturable absorber, a semiconductor saturable absorber, a semiconductor amplifier, a Mach-Zehnder interference optical fiber switch, a nonlinear optical loop mirror (NOLM) switch, or the like is available.

Ninth Embodiment

In the ninth embodiment, the optical signal processing device according to the embodiments is used in an optical communication system. In the embodiment illustrated in FIG. 17A, the optical signal processing device 100 (200) is provided on an optical transmission line between a transmitter 61 and a receiver 62. In this case, the optical signal processing device 100 is provided, for example, within an optical repeater device. The optical signal processing device 100 shapes the waveform of an optical signal received from an optical transmission line A, and guides the signal to an optical transmission line B. The optical transmission lines A and B may be configured, for example, to transmit an optical signal while amplifying the power with an optical amplifier, or may be optimally designed to compensate for the chromatic dispersion of the transmission line fiber.

In the embodiment illustrated in FIG. 17B, the optical signal processing device 100 is provided in the neighborhood of the receiver 62 (or within a receiving device). In this case, the receiver 62 can receive a waveform-shaped optical signal.

According to the ninth embodiment, receiver sensitivity and a transmission characteristic are improved. Especially, in an optical amplification relay transmission system, effects such as reductions in transmission power, an extension of a relay interval of an optical amplifier, reductions in the number of optical amplifiers, and the like can be expected.

Tenth Embodiment

Figure 18:
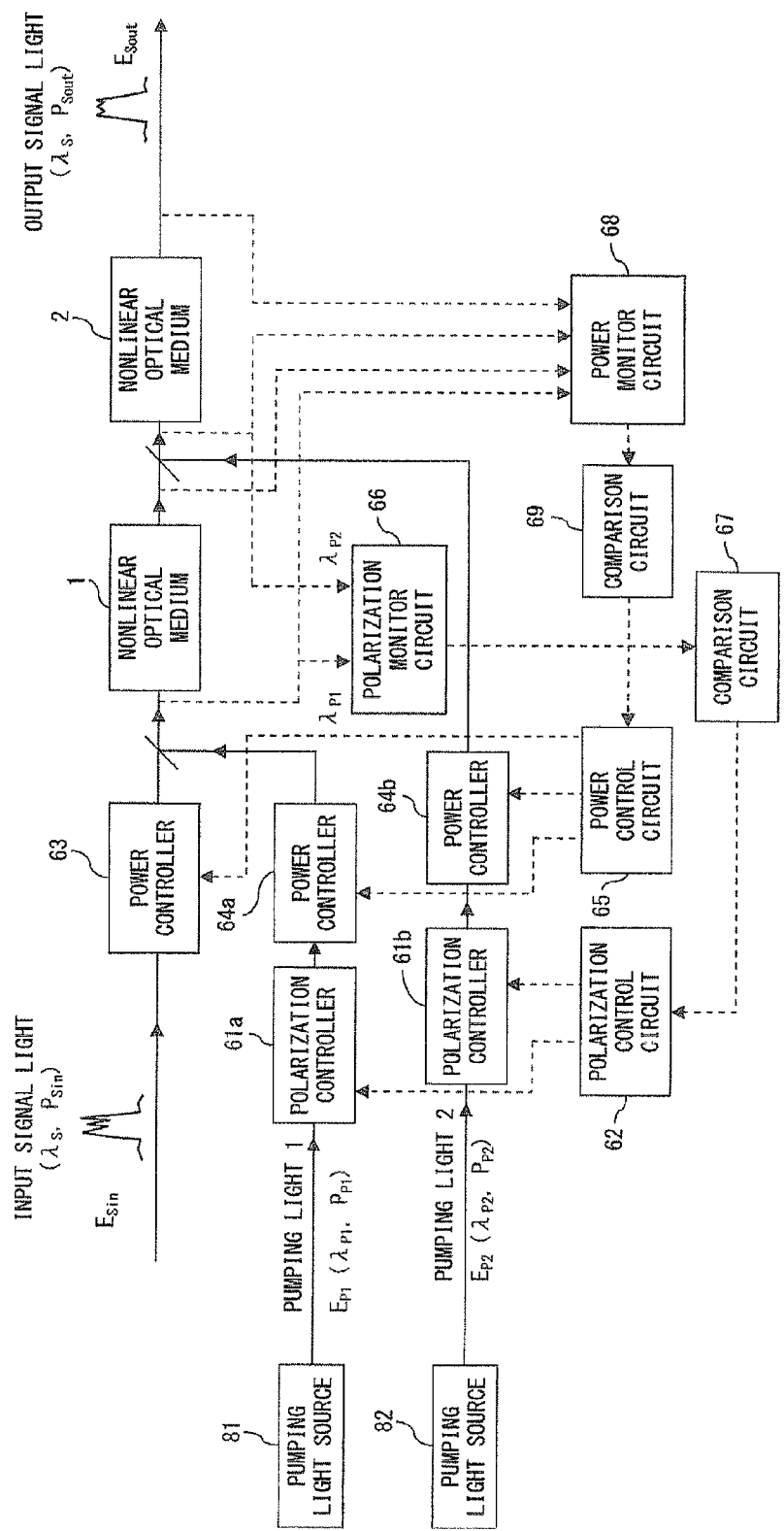
FIG. 18 illustrates a configuration of an optical signal processing device having a feedback system.

FIG. 18 illustrates a configuration of an optical signal processing device having a feedback system. Here, control procedures are described based on the configuration illustrated in FIG. 1. However, the control procedures can be substantially applied to the configuration illustrated in FIG. 11A in a similar manner. The nonlinear optical media 1 and 2 are second-order or third-order nonlinear optical media ($\chi^{(2)}$/ $\chi^{(3)}$), and implemented, for example, with the above described optical fibers 21 and 22.

Polarization controllers 61a and 61b respectively control the polarization states of the pumping lights 1 and 2. The polarization controllers 61a and 61b respectively control the polarization states of the pumping lights 1 and 2 in accordance with an instruction issued from a polarization control circuit 62. The polarization controllers 61a and 61b are implemented, for example, with a wavelength plate polarization controller, an LiNbO$_3$ polarization controller, a fiber-squeezer type polarization controller, a Faraday rotator, or the like.

A power controller 63 adjusts the power of input signal light. Power controllers 64a and 64b respectively adjust the powers of the pumping light 1 the polarization state of which is controlled by the polarization controller 61a, and the pumping light 2 the polarization state of which is controlled by the polarization controller 61b. The power controllers 63, 64a and 64b respectively control the powers of the signal light, the pumping light 1 and the pumping light 2 in accordance with an instruction issued from the power control circuit 65. The power controllers 63, 64a and 64b are implemented, for example, with an optical amplifier or an optical attenuator (or a combination of an optical amplifier and an optical attenuator, or the like).

A polarization monitor circuit 66 detects the polarization states of the pumping light 1 input to the nonlinear optical medium 1 and the pumping light 2 input to the nonlinear optical medium 2. The polarization monitor circuit 66 is configured, for example, with a plurality of pairs (for example, four pairs) of a polarizer and a photo detector. By detecting a polarization parameter for representing a polarization state with each polarizer, a polarization state is measured.

A comparison circuit 67 outputs a feedback value that represents a difference between an ideal value when the pumping lights 1 and 2 are mutually orthogonal and a value measured by the polarization monitor circuit 66. For example, a difference between the angle formed between the polarization directions of the pumping lights 1 and 2, and "90 degrees" is calculated. The polarization control circuit 62 issues an instruction to adjust the polarization state to the polarization controllers 61a and 61b so that the feedback value provided from the comparison circuit 67 becomes minimum. In the embodiments illustrated in FIGS. 7 and 14, the polarization states are adjusted so that the pumping lights respectively used in the optical circuits at the first and second stages mutually differ by approximately 45 degrees. Procedures for adjusting the polarization of the pumping light in each of the optical circuits conform to the above described adjustment method, and the pumping lights are adjusted so that the pumping lights have a polarization difference of 45 degrees by further arranging a polarization controller, which is not illustrated in FIG. 18, between the two optical circuits.

A power monitor circuit 68 monitors the power of signal light input to the nonlinear optical media 1 and 2, and the power of signal light output from the nonlinear optical media 1 and 2. The power monitor circuit 68 is configured, for example, by including a filter for extracting the wavelength $\lambda_S$ of the signal light, and a photo detector for receiving the signal light extracted by the filter. The power monitor circuit 68 may further include an amplification circuit for amplifying an electric signal obtained by the photo detector.

A comparison circuit 69 respectively calculates the gains of the nonlinear optical media 1 and 2 on the basis of the input power and the output power of the signal light. Moreover, the comparison circuit 69 compares the input power and/or the output power of the signal light with predetermined threshold power as occasion demands. The power control circuit 65 references the output of the comparison circuit 69, and issues an instruction to adjust optical power to the power controllers 63, 64a and 64b.

Pumping light sources 81 and 82 respectively generate the pumping lights 1 and 2. The pumping lights 1 and 2 may be continuous wave light or an optical pulse train. In the embodiment illustrated in FIG. 18, the pumping lights 1 and 2 are generated by the different light sources. However, the pumping lights 1 and 2 may be generated by splitting pumping light obtained from one light source.

The optical signal processing device configured as described above includes an optical bandpass filter at the output side of each of the nonlinear optical media 1 and 2. The optical bandpass filter is, for example, an optical wavelength filter of the same transmission frequency as the frequency of the signal light. The optical bandpass filter extracts the wavelength component of the signal light from the output light of the nonlinear optical media 1 and 2.

The polarization controllers 61a and 61b, and the power controllers 63, 64a and 64b are adjusted, for example, in accordance with the following procedures.

Initially, the states of the polarization controllers 61a and 61b are adjusted. Here, the polarization states of the pumping lights 1 and 2 are adjusted to become mutually orthogonal (or almost orthogonal).

Then, the power control circuit 65 adjusts the states of the power controllers 64a and 64b. Namely, the powers of the pumping lights 1 and 2 are controlled so that a desired or sufficient optical parametric gain can be obtained in each of the nonlinear optical media 1 and 2.

Thereafter, the power of the signal light is increased with the power controller 63 while the optical parametric gain in the nonlinear optical media 1 and 2 is being monitored. Here, the optical parametric gain is almost constant while the input power of the signal light is lower than the threshold power $P_1$ illustrated in FIGS. 4A and 4B. However, if the power of the signal light is further increased and becomes higher than the threshold power $P_1$, the optical parametric gain is saturated and decreases. Then, the power control circuit 65 terminates the adjustments of the power controllers 63, 64a and 64b at the time when the optical parametric gain decreases by a predetermined level.

If both of the nonlinear optical media 1 and 2 cannot be controlled to fall within a desired gain saturation area only with the adjustment of the input power of the signal light, which is made by the power controller 63, control by the power controller 64a or 64b may be performed in parallel with the control performed by the power controller 63. Alternatively, a power controller for adjusting the power of the signal light may be provided between the nonlinear optical media 1 and 2. Otherwise, a configuration for providing control light to the nonlinear optical medium 2 may be introduced to control the power of the control light while monitoring the gain of the nonlinear optical medium 2.

Additionally, to which extent the optical parametric gain is decreased with the above described adjustment procedures depends on a required level of the optical limiter function (namely, the waveform shaping function). For example, in a system where the waveform of input optical signal is expected to be relatively favorable, precedence is given to the efficient obtainment of a gain over a waveform shaping effect, and the optical parametric gain may be slightly decreased. In contrast, in a system where the waveform of input optical signal is expected to be significantly degraded, the optical parametric gain may be significantly decreased to obtain a sufficient waveform shaping effect. In addition to the above described procedures, optical signal output from the nonlinear optical media 1 and 2 may be monitored, and the feedback control may be performed for the power of signal light and/or pumping light (also control light if necessary) so that the quality (optical S/N Ratio, Q value, bit error rate, etc.) of the optical signal becomes optimum.

Furthermore, the optical signal processing device may be configured to use control light separately from pumping light as illustrated in FIG. 9. In this case, a power controller for adjusting the power of the control light is provided. Then, the adjustment of the power controller is terminated when the optical parametric gain decreases by a predetermined level by increasing the power of the control light while the gain of the optical parametric gain in the nonlinear optical media 1 and 2 is being monitored. In this case, the input power of the signal light may remain fixed, that is, the power controller 63 may not be necessary. Alternatively, the input power of the signal light may be adjusted by the power controller 63 as occasion demands. For example, if the signal light is WDM light, an instruction may be issued to the power controller, which is intended to control the signal light, so that the value obtained by dividing the total power of the WDM light by the number of channels is held to be a predetermined value.

<Effects Produced by the Configurations of the Embodiments>

With the optical signal processing devices according to the embodiments, the waveform shaping and the noise suppression of an optical signal can be made without depending on the polarization state of signal light. Especially, if the optical signal processing device according to the embodiments is used to shape the waveform of an optical signal, the optical S/N ratio of the optical signal is improved, a high-level demand (such as dispersion compensation of high precision, and the like) for a high-speed optical communication system is eased, and the performance enhancement and the cost reductions of an optical network can be realized. Moreover, according to the embodiments, optical signal processing for suppressing the intensity fluctuations and the intensity noise of signal light modulated with optical intensity modulation, optical phase modulation and optical frequency modulation can be executed. Furthermore, the optical signal processing devices are effective at reducing power consumption in an optical network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical signal processing device, comprising:
   nonlinear optical medium to which signal light, and first and second pumping lights having wavelengths different from the signal light are input;
   first and second power controllers, provided at input side of the nonlinear optical medium, to control powers of the first and the second pumping lights so that a predetermined gain is obtained in the nonlinear optical medium; and
   a polarization controller, provided at the input side of the nonlinear optical medium, to adjust the first and the second pumping lights so that polarization states of the first and the second pumping lights are mutually orthogonal.

2. The optical signal processing device according to claim 1, further comprising
   a third power controller to control power of the signal light so that a gain of the signal light, which is generated by a second-order or third-order nonlinear optical effect in the nonlinear optical medium, is saturated.

3. The optical signal processing device according to claim 2, further comprising
   a power monitor unit to monitor input power of the signal light input to the nonlinear optical medium, and output power of the signal light output from the nonlinear optical medium, wherein
   the third power controller increases the power of the signal light until the gain in the nonlinear optical medium, which is calculated based on the input power and the output power of the signal light, decreases.

4. The optical signal processing device according to claim 1, further comprising
   a polarization monitor unit to monitor the polarization states of the first and the second pumping lights input to the nonlinear optical medium, wherein
   the polarization controller controls the polarization states of the first and the second pumping lights in accordance with a monitoring result obtained by the polarization monitor unit.

5. The optical signal processing device according to claim 1, wherein
   the nonlinear optical medium includes first and second optical fibers that are cascade-connected,
   the polarization controller generates first and second linear polarized lights that are mutually orthogonal, and
   the first linear polarized light is input to the first optical fiber, and the second linear polarized light is input to the second optical fiber.

6. The optical signal processing device according to claim 5, wherein
   an optical filter to extract a signal light component, and an optical coupler to couple the signal light extracted by the optical filter and the second linear polarized light are provided between the first optical fiber and the second optical fiber.

7. The optical signal processing device according to claim 5, wherein
   a delay medium for providing a different delay to each wavelength is provided between the first optical fiber and the second optical fiber.

8. The optical signal processing device according to claim 7, wherein
   an optical fiber for providing a different group velocity to light waves having different wavelengths is used as the delay medium.

9. The optical signal processing device according to claim 1, wherein
   the first and the second pumping lights are optical pulse trains of a pulse width shorter than a signal carried by the signal light.

10. The optical signal processing device according to claim 1, further comprising a fourth power controller, provided at the input side of the nonlinear optical medium, to control power of control light having a wavelength different from the signal light, the first pumping light and the second pumping light, wherein the fourth power controller controls the power of the control light so that a gain generated by the pumping lights becomes saturated in the nonlinear optical medium.

11. The optical signal processing device according to claim 10, further comprising a power monitor unit to monitor input power of the signal light input to the nonlinear optical medium, and output power of the signal light output from the nonlinear optical medium, wherein the fourth power controller increases the power of the control light until the gain in the nonlinear optical medium, which is calculated based on the input power and the output power of the signal light, decreases.

12. The optical signal processing device according to claim 10, further comprising a unit to monitor a polarization state of the control light input to the nonlinear optical medium; and a unit to control the polarization state of the control light in accordance with a monitoring result.

13. The optical signal processing device according to claim 1, wherein the nonlinear optical medium includes an optical fiber having an average zero dispersion wavelength that matches or nearly matches the wavelengths of the first and the second pumping lights.

14. The optical signal processing device according to claim 1, wherein the nonlinear optical medium includes an optical fiber having an average zero dispersion wavelength shorter than the wavelengths of the first and the second pumping lights, and a value of a product of chromatic dispersion in the wavelength of the pumping light, and a difference between frequencies of the signal light and the pumping light is made to nearly match a doubled value of a product of a nonlinear optical coefficient of the optical fiber, power of pumping light, and a length of the optical fiber.

15. The optical signal processing device according to claim 1, wherein the signal light is wavelength-division multiplexed light carrying a plurality of optical signals.

16. An optical signal processing device, comprising:

an optical splitter/coupler to split light input from a first port into mutually orthogonal linear polarized lights and to guide the split lights to a second port and a third port, and to polarization-couple lights input from the second port and the third port;

a nonlinear optical medium provided between the second port and the third port of the optical splitter/coupler;

a polarization controller to control a polarization state of pumping light to be input to the nonlinear optical medium; and an optical device to guide signal light, and the pumping light, the polarization state of which is controlled by the polarization controller, to the first port of the optical splitter/coupler.

17. The optical signal processing device according to claim 16, wherein the polarization controller controls the polarization state of the pumping light so that the pumping light is split by the optical splitter/coupler into one pair of mutually orthogonal linear polarization components having almost equal powers.

18. The optical signal processing device according to claim 16, wherein:

the polarization controller generates first and second pumping lights having polarization states identical to one pair of mutually orthogonal linear polarized lights obtained by the optical splitter/coupler, and the optical device guides the first and the second pumping lights to the first port of the optical splitter/coupler along with the signal light.

19. An optical signal processing device having a first optical circuit, and a second optical circuit provided at an output side of the first optical circuit, wherein each of the first optical circuit and the second optical circuit comprises:

an optical splitter/coupler to split light input from a first port into mutually orthogonal linear polarized lights and to guide the split lights to a second port and a third port, and to polarization-couple lights input from the second port and the third port;

a nonlinear optical medium provided between the second port and the third port of the optical splitter/coupler;

a polarization controller to control a polarization state of pumping light to be input to the nonlinear optical medium; and an optical device to guide the signal light, and the pumping light, the polarization state of which is controlled by the polarization controller, to the first port of the optical splitter/coupler; and polarization of pumping light used in the second optical circuit differs by approximately 45 degrees from polarization of pumping light used in the first optical circuit.

\* \* \* \* \*